US012766477B2

(12) United States Patent
Takeuchi et al.

(10) Patent No.: US 12,766,477 B2
(45) Date of Patent: Oct. 20, 2026

(54) HEAT-EXPANDABLE MICROSPHERES, PROCESS FOR PRODUCING THE SAME, AND APPLICATION THEREOF

(71) Applicant: MATSUMOTO YUSHI-SEIYAKU CO., LTD., Yao (JP)

(72) Inventors: Jun Takeuchi, Yao (JP); Tomohiro Yamauchi, Yao (JP)

(73) Assignee: MATSUMOTO YUSHI-SEIYAKU CO., LTD., Osaka (JP)

( * ) Notice: Subject to any disclaimer, the term of this patent is extended or adjusted under 35 U.S.C. 154(b) by 844 days.

(21) Appl. No.: 17/801,950

(22) PCT Filed: Feb. 15, 2021

(86) PCT No.: PCT/JP2021/005405
§ 371 (c)(1),
(2) Date: Aug. 24, 2022

(87) PCT Pub. No.: WO2021/172062
PCT Pub. Date: Sep. 2, 2021

(65) Prior Publication Data

US 2023/0107785 A1 Apr. 6, 2023

(30) Foreign Application Priority Data

Feb. 28, 2020 (JP) ................................ 2020-032558

(51) Int. Cl.
*B01J 13/02* (2006.01)
*C08J 9/32* (2006.01)

(52) U.S. Cl.
CPC ................ *B01J 13/02* (2013.01); *C08J 9/32* (2013.01); *C08J 2203/22* (2013.01); *C08J 2333/08* (2013.01); *C08J 2333/20* (2013.01)

(58) Field of Classification Search
CPC ... C08J 9/20; C08J 9/32; C08J 2203/22; C08J 2333/08; C08J 2333/20; B01J 13/02; B01J 13/16; C09K 3/00
See application file for complete search history.

(56) References Cited

U.S. PATENT DOCUMENTS 5,155,138 A 10/1992 Lundqvist
5,332,854 A * 7/1994 Yokota .................. C09K 23/12
558/33

(Continued)

FOREIGN PATENT DOCUMENTS

CN 101341227 A 1/2009
CN 102746454 A 10/2012

(Continued)

OTHER PUBLICATIONS

Translation of JP2003220329 by Omura et al. (Year: 2003).*

(Continued)

*Primary Examiner* — Christina H.W. Rosebach
(74) *Attorney, Agent, or Firm* — Sughrue Mion, PLLC

(57) ABSTRACT

Heat-expandable microspheres which have a blowing agent encapsulated efficiently therein so as to prevent the blowing agent from escaping out of the microspheres during storage at high temperature, a process for producing the same, and applications thereof. The process for producing heat-expandable microspheres containing a thermoplastic resin shell and a thermally vaporizable blowing agent encapsulated therein includes preparing an aqueous suspension in which oil droplets of an oily mixture containing the blowing agent and a polymerizable component are dispersed in an aqueous dispersion medium and fine particles of an inorganic compound and a monomer (A) and/or a monomer (B) described below are contained in the aqueous dispersion medium; and polymerizing the polymerizable component, wherein Monomer (A): Polymerizable unsaturated mono- (Continued)

mer having a total sulfuric acid value ranging from more than 0% to 35%; and Monomer (B): Polymerizable unsaturated monomer with a total phosphoric acid ranging from more than 0% to 50%.

10 Claims, 1 Drawing Sheet

(56) References Cited

U.S. PATENT DOCUMENTS

| | | | | |
|---|---|---|---|---|
| 6,200,681 | B1 | 3/2001 | Jahns et al. | |
| 2009/0062462 | A1 | 3/2009 | Miyabayashi | |
| 2009/0292031 | A1 | 11/2009 | Ejiri | |
| 2014/0243438 | A1 | 8/2014 | Ejiri | |
| 2014/0364521 | A1* | 12/2014 | Tayagaki | C08J 9/228 521/137 |
| 2016/0237234 | A1* | 8/2016 | Tayagaki | C08F 2/18 |
| 2017/0081492 | A1 | 3/2017 | Sakabe et al. | |
| 2017/0158835 | A1 | 6/2017 | Ejiri | |
| 2019/0053990 | A1 | 2/2019 | Kusaka et al. | |
| 2020/0108367 | A1 | 4/2020 | Dungworth et al. | |
| 2021/0161776 | A1 | 6/2021 | Kusaka et al. | |

FOREIGN PATENT DOCUMENTS

| | | | |
|---|---|---|---|
| CN | 104053681 | A | 9/2014 |
| CN | 106832110 | A | 6/2017 |
| CN | 107880204 | A | 4/2018 |
| CN | 108883386 | A | 11/2018 |
| JP | 4-292643 | A | 10/1992 |
| JP | 2002-516913 | A | 6/2002 |
| JP | 2003220329 | A * | 8/2003 |
| JP | 2006-45532 | A | 2/2006 |
| JP | 2007-058003 | A | 3/2007 |
| JP | 2007-187691 | A | 7/2007 |
| JP | 2007-187692 | A | 7/2007 |
| JP | 2007-187693 | A | 7/2007 |
| JP | 2016-169274 | A | 9/2016 |
| JP | 2019-513536 | A | 5/2019 |
| KR | 10-2017-0012203 | A | 2/2017 |
| KR | 10-2018-0088424 | A | 8/2018 |
| WO | 2006/043571 | A1 | 4/2006 |

OTHER PUBLICATIONS

Arora, Pinklesh et al. Synthesis, Properties and Applications of Anionic Phosphate Ester Surfactants: A Review. Tenside Surf. Det. 55 (2018). pp. 266-272 (Year: 2018).*

Machine translation of JP 2009235355 by Hashiba et al (Year: 2009).*

Office Action dated Apr. 22, 2023 from the Chinese Patent Office in corresponding Application No. 202180015531.6.

International Search Report for PCT/JP2021/005405 dated, May 11, 2021 (PCT/ISA/210).

Extended European Search Report dated Jan. 2, 2024 in European Application No. 21761849.5.

Korean Office Action dated Sep. 23, 2025, issued in Korean application No. 10-2022-7029764.

* cited by examiner

HEAT-EXPANDABLE MICROSPHERES, PROCESS FOR PRODUCING THE SAME, AND APPLICATION THEREOF

CROSS-REFERENCE TO RELATED APPLICATIONS

This application is a National Stage of International Application No. PCT/JP2021/005405 filed Feb. 15, 2021, claiming priority from Japanese Patent Application No. 2020-032558 filed Feb. 28, 2020.

BACKGROUND OF THE INVENTION

1. Field of the Invention

The present invention relates to heat-expandable microspheres, a process for producing the same and applications thereof.

2. Description of the Related Art

Heat-expandable microspheres are fine particles, each of which contains a thermoplastic resin shell and a blowing agent encapsulated therein, and are expandable by heating. Owing to such property, heat-expandable microspheres are employed in a wide range of applications, such as foamable inks, designing additives for wallpapers and lightweight fillers for resins and paints.

The heat-expandable microspheres are obtained by dispersing an oily mixture containing a polymerizable component and a blowing agent in an aqueous dispersion medium containing a dispersing agent, such as colloidal silica and magnesium hydroxide, and a surfactant acting as a dispersion-stabilizing auxiliary; and polymerizing the polymerizable component. Specifically, magnesium hydroxide as the dispersing agent and sodium lauryl sulfate as the dispersion-stabilizing auxiliary are exemplified in PTL 1.

[PTL 1] Japanese Patent Application Publication 1992-292643

3. Problems to be Solved by the Invention

The blowing agent of the heat-expandable microspheres obtained in the process described in PTL 1, however, is not encapsulated efficiently therein and is apt to escape out the heat-expandable microspheres stored at high temperature.

SUMMARY OF THE INVENTION

It is therefore an object of the present invention to provide heat-expandable microspheres which have a blowing agent encapsulated efficiently therein so as to prevent the blowing agent from escaping out of the microspheres during storage at high temperature, a process for producing the same, and applications thereof.

After diligent study, the inventors found that the problem mentioned above is solved by providing a process for producing heat-expandable microspheres in which an aqueous dispersion medium containing a specific monomer is used, to thereby achieve the present invention.

The present invention provides a process for producing heat-expandable microspheres containing a thermoplastic resin shell and a thermally vaporizable blowing agent encapsulated therein; wherein the process includes a step of preparing an aqueous suspension in which oil droplets of an oily mixture containing the blowing agent and a polymerizable component are dispersed in an aqueous dispersion medium and fine particles of an inorganic compound and the monomer (A) and/or the monomer (B) described below are contained in the aqueous dispersion medium; and a step of polymerizing the polymerizable component:

Monomer (A): Polymerizable unsaturated monomer having a total sulfuric acid value ranging from more than 0% to 35%, Monomer (B): Polymerizable unsaturated monomer having a total phosphoric acid value ranging from more than 0% to 50%.

As used herein, the term "and/or" means "one or both of".

In various preferred embodiments, the process for producing the heat-expandable microspheres satisfies at least one of conditions 1) to 6) described below.

1) The monomer (A) has an aromatic ring in its molecule.
2) The total amount of the monomer (A) and the monomer (B) contained in the aqueous dispersion medium ranges from 0.00001 to 10 parts by weight to 100 parts by weight of the oily mixture.
3) The inorganic compound exists in a colloidal state.
4) The inorganic compound is a metal compound, and the metal in the compound is an alkali earth metal.
5) The pH of the aqueous dispersion medium ranges from 6 to 12.
6) The oil droplets further contain the monomer (A) and/or the monomer (B).

The heat-expandable microspheres of the present invention contain a thermoplastic resin shell and a thermally vaporizable blowing agent encapsulated therein; wherein the thermoplastic resin is a polymer containing polymerizable unsaturated monomer units and the polymerizable unsaturated monomer units contain the polymerizable unsaturated monomer unit (a) and/or the polymerizable unsaturated monomer unit (b) described below.

Polymerizable unsaturated monomer unit (a): Ethylenically unsaturated monomer unit having a total sulfuric acid value ranging from more than 0% to 35%

Polymerizable unsaturated monomer unit (b): Ethylenically unsaturated monomer unit having a total phosphoric acid value ranging from more than 0% to 50%

The monomer unit (a) for the heat-expandable microspheres preferably contains an aromatic ring.

The hollow particle of the present invention is a product manufactured by expanding the heat-expandable microspheres described above.

The composition of the present invention contains a base component and at least one type of particulate substance selected from the group consisting of the heat-expandable microspheres and hollow particles described above.

The formed product of the present invention is manufactured by forming the composition.

Advantageous Effects of Invention

The heat-expandable microspheres of the present invention efficiently encapsulate the blowing agent therein, prevent the blowing agent from escaping out of the microspheres during storage at high temperature and have excellent expansion performance.

The production process of heat-expandable microspheres of the present invention enables the production of heat-expandable microspheres encapsulating the blowing agent therein efficiently, preventing the blowing agent from escaping out of the microspheres during storage at high temperature, and having excellent expansion performance.

The composition of the present invention is manufactured into a lightweight formed product having a high expansion ratio.

The formed product of the present invention has a high expansion ratio and is lightweight.

REFERENCE SYMBOLS LIST

Figure 1:
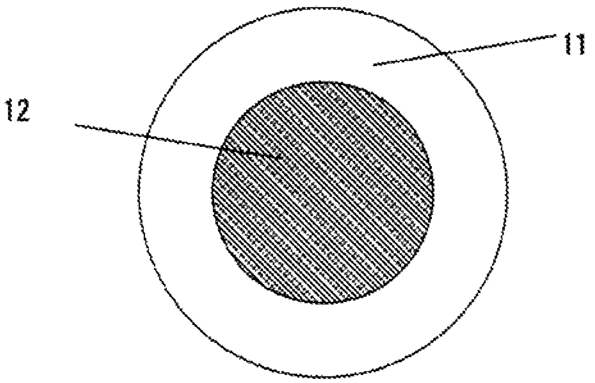
FIG. 1 is a schematic diagram of an example of the heat-expandable microspheres of the present invention.

Reference symbols used to identify various features in the drawings include the following.

1: Hollow particles (particulate-coated hollow particles)
2: Shell
3: Hollow part
4: Particulate material (in a state of adhesion)
5: Particulate material (in a state of fixation in a dent)
11: Thermoplastic resin shell
12: Blowing agent

DETAILED DESCRIPTION OF THE PREFERRED EMBODIMENTS

The invention will next be described in greater detail with reference to the drawings. However, the present invention should not be construed as being limited thereto.

Process for Producing Heat-Expandable Microspheres

The process of the present invention provides heat-expandable microspheres containing a thermoplastic resin shell and a thermally vaporizable blowing agent encapsulated therein.

Polymerization Step

The blowing agent is not specifically restricted so far as it is thermally vaporizable, and includes, for example, hydrocarbons having a carbon number ranging from 3 to 13, such as propane, (iso) butane, (iso) pentane, (iso) hexane, (iso) heptane, (iso) octane, (iso) nonane, (iso) decane, (iso) undecane, (iso) dodecane and (iso)tridecane; hydrocarbons having a carbon number greater than 13 and not greater than 20, such as (iso) hexadecane and (iso) eicosane; hydrocarbons from petroleum fractions, such as pseudocumene, petroleum ether, and normal paraffins and isoparaffins having an initial boiling point ranging from 150 to 260° C. and/or being distilled in the temperature range from 70 to 360° C.; halides of $C_1$-$C_{12}$ hydrocarbons, such as methyl chloride, methylene chloride, chloroform and carbon tetrachloride; fluorine-containing compounds, such as hydrofluoroether; silanes having $C_1$-$C_5$alkyl groups, such as tetramethyl silane, trimethylethyl silane, trimethylisopropyl silane and trimethyl-n-propyl silane; and compounds which thermally decompose to generate gases, such as azodicarbonamide, N,N'-dinitrosopentamethylenetetramine and 4,4'-oxybis(benzenesulfonyl hydrazide). One of or a combination of at least two of the blowing agents can be used. The blowing agent can be any of a linear, branched, and alicyclic compound, and is preferably an aliphatic compound.

Of those blowing agents, hydrocarbons having 5 or a lower number of carbon atoms are preferable to improve the expansion performance of heat-expandable microspheres. The hydrocarbons having at least 6 carbon atoms contribute to increased expansion-starting temperature and maximum expansion temperature of heat-expandable microspheres. Isobutane and isopentane are preferable hydrocarbons having 5 or lower number of carbon atoms, while isooctane is a preferable hydrocarbon having at least 6 carbon atoms.

The blowing agent of the present invention preferably contains a hydrocarbon having 4 or lower number of carbon atoms, especially isobutane, for attaining the effect of the present invention.

The blowing agent is a thermally vaporizable substance, and the blowing agent to be encapsulated in heat-expandable microspheres preferably has a boiling point not higher than the softening point of the thermoplastic resin of the microspheres. This is because such blowing agent can generate a sufficiently high vapor pressure for expanding the microspheres at their expansion temperature and attain a high expansion ratio of the microspheres. The blowing agent can also contain a substance having a boiling point higher than the softening point of the thermoplastic resin in addition to a substance having a boiling point not higher than the softening point of the thermoplastic resin.

The polymerizable component is polymerized (preferably in the presence of a polymerization initiator) into a thermoplastic resin which constitutes the shell of the heat-expandable microspheres. The polymerizable component essentially contains a polymerizable unsaturated monomer (hereinafter also referred to as a monomer) having a (radically) polymerizable carbon-carbon double bond per molecule and can contain a polymerizable unsaturated monomer (hereinafter also referred to as a cross-linking agent) having at least two (radically) polymerizable carbon-carbon double bonds per molecule. Both the monomer and crosslinking agent can react in addition polymerization, and the cross-linking agent introduces a cross-linked structure into the thermoplastic resin.

The monomer is not specifically restricted and includes, for example, nitrile monomers, such as acrylonitrile, methacrylonitrile and fumaronitrile; carboxyl-group-containing monomers, such as acrylic acid, methacrylic acid, ethacrylic acid, crotonic acid, cinnamic acid, maleic acid, itaconic acid, fumaric acid, citraconic acid and chloromaleic acid; vinyl halide monomers, such as vinyl chloride; vinylidene halide monomers, such as vinylidene chloride; vinyl ester monomers, such as vinyl acetate, vinyl propionate and vinyl butyrate; (meth)acrylate ester monomers, such as methyl (meth)acrylate, ethyl (meth)acrylate, n-butyl (meth)acrylate, t-butyl (meth)acrylate, 2-ethylhexyl (meth)acrylate, stearyl (meth)acrylate, phenyl (meth)acrylate, isobornyl (meth) acrylate, cyclohexyl (meth)acrylate, benzyl (meth)acrylate and 2-hydroxyethyl (meth)acrylate; (meth)acrylamide monomers, such as acrylamide, substituted acrylamide, methacrylamide and substituted methacrylamide; maleimide monomers, such as N-phenyl maleimide and N-cyclohexyl maleimide; styrene monomers, such as styrene and $\alpha$-methyl styrene; ethylenically unsaturated monoolefin monomers, such as ethylene, propylene and isobutylene; vinyl ether monomers, such as vinyl methyl ether, vinyl ethyl ether and vinyl isobutyl ether; vinyl ketone monomers, such as vinyl methyl ketone; N-vinyl monomers, such as N-vinyl carbazole and N-vinyl pyrolidone; and vinyl naphthalene salts. The polymerizable component can contain one of or a combination of at least two of the monomers. The term, (meth)acryl, as used herein means acryl or methacryl.

The polymerizable component preferably contains at least one type of monomer selected from the group consisting of nitrile monomers, carboxyl-group-containing monomers, (meth)acrylate ester monomers, styrene monomers, vinyl ester monomers, acryl amide monomers and vinylidene halide monomers.

The polymerizable component preferably contains a nitrile monomer for imparting good solvent resistance to the resultant heat-expandable microspheres. Acrylonitrile and methacrylonitrile are preferable nitrile monomers for their availability and good heat and solvent resistance of the resultant heat-expandable microspheres.

The amount of the nitrile monomer in the polymerizable component is not specifically restricted and preferably ranges from 10 to 100 wt %, more preferably from 20 to 100 wt %, further more preferably from 40 to 100 wt %, yet further more preferably from 50 to 100 wt %, and most preferably from 60 to 100 wt % of the monomer component in the polymerizable component. A monomer component containing less than 20 wt % of the nitrile monomer can cause poor heat resistance of the resultant heat-expandable microspheres.

If the nitrile monomer contains acrylonitrile (AN) and methacrylonitrile (MAN), the weight ratio of acrylonitrile to methacrylonitrile (AN:MAN) is not specifically restricted and preferably ranges from 10:90 to 90:10. If the AN:MAN ratio is smaller than 10:90, the resultant heat-expandable microspheres can have a poor gas barrier effect. On the other hand, if the AN:MAN ratio is greater than 90:10, the resultant heat-expandable microspheres can have an insufficient expansion ratio. The upper limit of the AN:MAN ratio is preferably 80:20, more preferably 70:30 and further more preferably 65:35. On the other hand, the lower limit of the AN:MAN ratio is preferably 20:80, more preferably 30:70 and further more preferably 35:65.

The polymerizable component containing vinylidene chloride as the monomer contributes to an improved gas barrier effect of the resultant heat-expandable microspheres. The polymerizable component containing a (meth)acrylate ester monomer and/or styrene monomer contributes to a more adjustable thermal expansion performance of the resultant heat-expandable microspheres. The polymerizable component containing a (meth)acryl amide monomer improves the heat resistance of the resultant heat-expandable microspheres.

The amount of the at least one type of monomer selected from the group consisting of vinylidene chloride, (meth)acrylate ester monomer, (meth)acryl amide monomer, maleimide monomer and styrene monomer is preferably not higher than 90 wt %, more preferably not higher than 85 wt %, and further more preferably not higher than 80 wt % of the monomer component. An amount higher than 90 wt % can cause poor heat resistance of the resultant heat-expandable microspheres.

The polymerizable component containing a carboxyl-group-containing monomer as the monomer is preferable for good heat resistance and solvent resistance of the resultant heat-expandable microspheres. Acrylic acid and methacrylic acid are preferable carboxyl-group-containing monomers because of their availability and improved heat resistance of the resultant heat-expandable microspheres.

The amount of the carboxyl-group-containing monomer in the polymerizable component is not specifically restricted and preferably ranges from 10 to 70 wt % of the polymerizable component. A polymerizable component containing less than 10 wt % of the carboxyl-group-containing monomer can cause an insufficiently improved heat resistance of the resultant heat-expandable microspheres. On the other hand, a polymerizable component containing more than 70 wt % of the carboxyl-group-containing monomer can cause a poor gas barrier effect of the resultant heat-expandable microspheres. The upper limit of the amount of the carboxyl-group-containing monomer in the polymerizable component is preferably 60 wt %, more preferably 50 wt %, further more preferably 45 wt %, and most preferably 40 wt %. On the other hand, the lower limit of the amount of the carboxyl-group-containing monomer in the polymerizable component is preferably 15 wt %, more preferably 20 wt %, further more preferably 25 wt %, and most preferably 30 wt %.

If the polymerizable component contains a nitrile monomer and carboxyl-group-containing monomer, the total amount of the nitrile monomer and carboxyl-group-containing monomer is not specifically restricted and is preferably at least 50 wt %, more preferably at least 60 wt %, further more preferably at least 70 wt %, yet further more preferably at least 80 wt %, and most preferably at least 90 wt %.

In this case, the amount of the carboxyl-group-containing monomer in the total amount of the carboxyl-group-containing monomer and nitrile monomer preferably ranges from 10 to 70 wt %. If the amount of the carboxyl-group-containing monomer is smaller than 10 wt %, the resultant heat-expandable microspheres can have an insufficiently improved heat resistance and solvent resistance and exhibit unstable expansion performance in high temperature range and long heating time. On the other hand, if the amount of the carboxyl-group-containing monomer is greater than 70 wt %, the resultant heat-expandable microspheres can have poor expansion performance. The upper limit of the amount of the carboxyl-group-containing monomer is preferably 60 wt %, more preferably 50 wt %, further more preferably 45 wt %, and most preferably 40 wt %. On the other hand, the lower limit of the amount of the carboxyl-group-containing monomer is preferably 15 wt %, more preferably 20 wt %, further more preferably 25 wt %, and most preferably 30 wt %.

The polymerizable component can contain a crosslinking agent as mentioned above. Polymerization by the crosslinking agent minimizes the decrease of the retention (retention ratio) of the encapsulated blowing agent after thermal expansion of the resultant heat-expandable microspheres to attain efficient thermal expansion of the microspheres.

The crosslinking agent is not specifically restricted, and includes, for example, aromatic divinyl compounds, such as divinylbenzene; and di(meth)acrylate compounds, such as allyl methacrylate, triacrylformal, triallyl isocyanate, ethylene glycol di(meth)acrylate, diethylene glycol di(meth)acrylate, triethylene glycol di(meth)acrylate, 1,4-butanediol di(meth)acrylate, 1,9-nonanediol di(meth)acrylate, 1,10-decanediol di(meth)acrylate, PEG (200) di(meth)acrylate, PEG (400) di(meth)acrylate, PEG (600) di(meth)acrylate, trimethylolpropane trimethacrylate, glycerin dimethacrylate, dimethylol-tricyclodecane diacrylate, pentaerythritol tri(meth)acrylate, pentaerythritol tetraacrylate, dipentaerythritol hexaacrylate, and 2-butyl-2-ethyl-1,3-propanediol diacrylate. One of or a combination of at least two of those crosslinking agents can be used.

The amount of the crosslinking agent in the polymerizable component is not specifically restricted and preferably ranges from 0.01 to 8 parts by weight, more preferably from 0.1 to 5 parts by weight and further more preferably from 0.15 to 3 parts by weight to 100 parts by weight of the polymerizable component, considering the degree of crosslinking, retention ratio of the blowing agent encapsulated in the shell, and the heat-resistance and thermal expansion performance of the resultant heat-expandable microspheres.

In the polymerization step, the polymerizable component is preferably polymerized in the presence of a polymerization initiator. The polymerization initiator should be contained in the oily mixture in combination with the polymerizable component and blowing agent.

The polymerization initiator is not specifically restricted, and includes, for example, peroxides, such as peroxydicarbonates, peroxyesters, and diacyl peroxides; and azo compounds, such as azonitriles, azoesters, azoamides, azoalkyls and polymeric azo initiators. One of or a combination of at least two of the polymerization initiators can be used. The polymerization initiator is preferably an oil-soluble polymerization initiator which is soluble in the monomer.

The amount of the polymerization initiator is not specifically restricted and preferably ranges from 0.2 to 8 parts by weight and more preferably from 0.3 to 7 parts by weight to 100 parts by weight of the polymerizable component.

In the polymerization step, the oily mixture can further contain a chain transfer agent.

In the process of the present invention, the aqueous dispersion medium contains water, such as deionized water, distilled water and tap water, as the main component in which the oily mixture of the polymerizable component and blowing agent is dispersed. The aqueous dispersion medium can further contain a hydrophilic organic solvent, such as an alcohol. The amount of the aqueous dispersion medium used in the process is not specifically restricted, and preferably ranges from 100 to 1000 parts by weight to 100 parts by weight of the polymerizable component.

In the process of the present invention, the aqueous dispersion medium contains fine particles of an inorganic compound as a dispersion stabilizer. The compound enables the production of heat-expandable microspheres with high reproducibility.

The fine particles of an inorganic compound are dispersed in the aqueous dispersion medium in the polymerization step and are hardly soluble or insoluble in water. In the present invention, the phrase, "hardly soluble or insoluble in water", means that less than 1 g (preferably not more than 0.8 g and more preferably not more than 0.5 g) of a substance is soluble in 100 g of water at 25° C.

The fine particles of an inorganic compound preferably exist in a colloidal state (in other words, the fine particles of an inorganic compound are the suspended particles of a colloid that are dispersed in a medium (water in the present invention)) to sufficiently stabilize the dispersed oil droplets containing the polymerizable component and blowing agent in the aqueous dispersion medium.

The method of preparing the colloid of the fine particles of an inorganic compound is not specifically restricted and includes, for example, the steps of dissolving a water-soluble metal salt in an acidic or neutral aqueous medium mainly composed of water and adding a basic substance, such as sodium hydroxide or potassium hydroxide, to make the mixture into the colloid of the fine particles of a metal compound.

The inorganic compound is not specifically restricted and includes metal compounds composed of metal salts or metal hydroxides, colloidal silica, alumina sol, zirconia sol, and titania sol. One of or a combination of at least two of such inorganic compounds can be used.

Of those inorganic compounds mentioned above, metal compounds are preferable for preventing the agglomeration of the resultant heat-expandable microspheres The metals of the metal compounds used as the inorganic compounds include, for example, alkali metals, such as lithium, sodium, potassium, rubidium, cesium and francium; alkali earth metals (the group 2 metals in the periodic table), such as beryllium, magnesium, calcium, strontium, barium and radium; transition metals, such as titan, vanadium, manganese, iron, nickel, copper, zirconium and yttrium; the group 12 metals in the periodic table, such as zinc and cadmium; the group 13 metals in the periodic table, such as aluminum, gallium and thallium; and the group 14 metals in the periodic table, such as tin and lead. Of those metals, alkali earth metals, transition metals and the group 12 metals in the periodic table are preferable and alkali earth metals are further preferable.

The metal salts include halide salts, such as chloride salts, bromide salts and iodide salts, sulfate salts, sulfite salts, nitrate salts, nitrite salts, carbonate salts, hydrogen carbonate salts, pyrophosphate salts, phosphate salts and phosphite salts.

Any of the salts and hydroxides of the metals described above can be used as the metal compounds and they include, for example, iron (II) hydroxide, iron (III) oxide-hydroxide, zinc hydroxide, nickel (II) hydroxide, manganese (II) hydroxide, cadmium hydroxide, beryllium hydroxide, magnesium hydroxide, calcium hydroxide, calcium phosphate, calcium carbonate and barium sulfate. Of those metal compounds, salts, or hydroxides of alkali earth metals, such as magnesium hydroxide, calcium hydroxide, calcium phosphate, calcium carbonate and barium sulfate, are preferable for their high effect of stabilizing the dispersed oil droplets containing the polymerizable component and blowing agent in the aqueous dispersion medium.

The amount of the fine particles of an inorganic compound contained in the aqueous dispersion medium is not specifically restricted and is properly selected according to the intended particle size of heat-expandable microspheres. The amount of the fine particles of an inorganic compound contained in the aqueous dispersion medium preferably ranges from 0.1 to 20 parts by weight, more preferably from 1 to 18 parts by weight and further more preferably from 2 to 16 parts by weight to 100 parts by weight of the total amount of the polymerizable component and blowing agent, though the amount is not specifically restricted. An amount of the fine particles of an inorganic compound beyond the range described above can cause instable dispersion of the oil droplets of the oily mixture in the aqueous dispersion medium during the polymerization step and can lead to agglomeration of the oil droplets and polymerized product.

In the process of the present invention, the monomer (A) and/or the monomer (B) described below are contained in the aqueous dispersion medium:

Monomer (A): Polymerizable unsaturated monomer having a total sulfuric acid value ranging from more than 0% to 35%, Monomer (B): Polymerizable unsaturated monomer having a total phosphoric acid value ranging from more than 0% to 50%.

If an aqueous suspension is prepared by dispersing the above-mentioned oil droplets of the oily mixture of the polymerizable component and blowing agent in an aqueous dispersion medium containing the monomer (A) and/or the monomer (B), the monomer (A) and/or the monomer (B) can polymerize with the polymerizable component at the interface of the droplets of the oily mixture of the polymerizable component and blowing agent to increase the polymerization degree of the polymerized product at the interface of the oil droplets during the polymerization step. Thus, it is estimated that the escape of the blowing agent from the oil droplets is prevented and heat-expandable microspheres with high encapsulation efficiency are obtained. In addition, the thermoplastic resin constituting the shell of the resultant heat-expandable microspheres is estimated to have a highly dense structure especially at the surface of the shell to prevent the escape of the blowing agent from the resultant heat-expandable microspheres during storage at high temperature.

The process of the present invention for producing heat-expandable microspheres is not specifically restricted and can include several methods, such as a method including the step of preparing an aqueous suspension containing dispersed oil droplets of an oily mixture by dispersing the oily mixture in an aqueous dispersion medium containing the monomer (A) and/or the monomer (B), and the step of polymerizing the polymerizable component (hereinafter also referred to as the method 1); and a method including the step of preparing an aqueous suspension by dispersing an oily mixture in an aqueous dispersion medium to disperse oil droplets of the oily mixture in the medium and by adding the monomer (A) and/or the monomer (B) to the dispersion, and the step of polymerizing the polymerizable component (hereinafter also referred to as the method 2). For the stabilization of dispersed oil droplets and efficiency of the polymerization of the polymerizable component and the monomer (A) and/or the monomer (B), the method 1 is preferable.

The monomer (A) is a polymerizable unsaturated monomer having a total sulfuric acid value ranging from more than 0% to 35% and a polymerizable carbon-carbon double bond in its molecule. The monomer (A) is polymerizable with the polymerizable component as mentioned above. The number of the polymerizable carbon-carbon double bonds per molecule of the monomer (A) can be one or more, though one polymerizable carbon-carbon double bond per molecule is preferable for the expansion performance of the resultant heat-expandable microspheres.

The monomer (A) also contains at least one type of group selected from the group consisting of sulfate group, sulfonate group and the groups of their salts. The salts of sulfate and sulfonate groups include, for example, metal salts, such as sodium salts and potassium salts, and ammonium salts. The monomer (A) is preferably water-soluble and is preferably anionic for attaining the effect of the present invention. The term, "water-soluble", in the present invention means that at least 1 g (preferably at least 5 g and more preferably at least 10 g) of a substance is soluble in 100 g of water at 25° C.

The total sulfuric acid value of the monomer (A) ranges from more than 0% to 35%. If the total sulfuric acid value of the monomer (A) is higher than 35%, the polymerization degree of the polymerized product at the interface of the oil droplets decreases to decrease the compactness of the thermoplastic resin constituting the shell of the resultant microspheres. The upper limit of the total sulfuric acid value of the monomer (A) is preferably 30%, more preferably 25%, further more preferably 20%, and yet further more preferably 15%. On the other hand, the lower limit of the total sulfuric acid value of the monomer (A) is preferably 0.1%, more preferably 0.3%, further more preferably 0.5%, and yet further more preferably 1%. The "total sulfuric acid value of the monomer (A)" in the present invention means the value obtained by measuring the concentration of sulfur atoms in the monomer (A) in an analysis with inductively coupled plasma (ICP) and converting the obtained concentration of total sulfur atoms into the amount of sulfuric acid ($SO_3$) based on the atomic weight of sulfur and the molecular weight of sulfuric acid. In the conversion, the atomic weights of sulfur and oxygen are defined as 32 and 16 respectively.

The monomer (A) includes, for example, polyoxyethylene propenyl alkylphenyl ether sulfate salt, ammonium sulfosuccinate diester, alkylallyl sulfosuccinate salt, polyoxyethylene alkylpropylene phenylether sulfate salt, polyoxyethylene-1-(allyoxymethyl) alkylether sulfate salt, bis-(polyoxyethylene polycyclic phenylether) methacrylate sulfate salt, and polyoxyethylene styrenated propenylphenyl ether sulfate salt. One of or a combination of at least two of the monomers (A) can be used.

The commercially available monomer (A) includes, for example, HITENOL™ HS-10, HS-20, BC-10, BC-1025, BC-20, BC-2020, BC-3025, KH-05, KH-10, KH-1025, AR-10, AR-20, AR-1025, AR-2020 and AR-3025 manufactured by DKS Co., Ltd.; LATEMUL™ PD-104 and PD-105 manufactured by Kao Corporation; ELEMINOL™ JS-20 and RS-3000 manufactured by Sanyo Chemical Ltd.; ADEKA REASOAP® SR-10, SR-20, SR-1025, SR-3025, SE-10N and SE-1025A manufactured by Adeka Corporation; and Antox™ MS-60, MS-2N and SAD manufactured by Nippon Nyukazai Co., Ltd. One of or a combination of at least two of those monomers can be used.

The monomer (A) can have an aromatic ring in its molecule. An aromatic ring in the molecule of the monomer (A) is preferable for improving the polymerization efficiency of the monomer (A) with the polymerizable component in the oil droplets.

The number of the aromatic rings per molecule of the monomer (A) is not specifically restricted and preferably ranges from 1 to 8, more preferably from 1 to 7, further more preferably from 1 to 6, and yet further more preferably from 1 to 5 to attain the effect of the invention.

The monomer (A) can also be an alkylene oxide adduct. An alkylene oxide adduct used as the monomer (A) can function as a dispersion-stabilizing auxiliary as described below to improve the stability of the oil droplets of the oily mixture in the polymerization step.

If the monomer (A) is an alkylene oxide adduct, the alkylene oxide added the monomer (A) should have a carbon number preferably ranging from 2 to 5, more preferably from 2 to 4 and further more preferably from 2 to 3. The upper limit of the number of moles of the added alkylene oxide is preferably 100, more preferably 70 and further more preferably 50. The lower limit of the number of moles of the added alkylene oxide is preferably 1, more preferably 2 and further more preferably 3.

The monomer (B) is a polymerizable unsaturated monomer having a total phosphoric acid value ranging from more than 0% to 50% and a polymerizable carbon-carbon double bond in its molecule. The monomer (B) is polymerizable with the polymerizable component such as the monomer (A). The number of polymerizable carbon-carbon double bonds per molecule can be one or more, though one polymerizable carbon-carbon double bond per molecule is preferable for the expansion performance of the resultant heat-expandable microspheres.

The monomer (B) also contains at least one type of group selected from the group consisting of phosphate group, phosphonate group, pyrophosphate group and groups of their salts. The salts of phosphate, phosphonate and pyrophosphate groups include, for example, metal salts, such as sodium salts and potassium salts, and ammonium salts. The monomer (B) is preferably water-soluble, and the solution can be used by neutralizing the phosphate, phosphonate, and pyrophosphate groups with an alkaline agent. The monomer (B) is preferably anionic for attaining the effect of the present invention.

The total phosphoric acid value of the monomer (B) ranges from more than 0% to 50%. If the total phosphoric acid value of the monomer (B) is higher than 50%, the polymerization degree of the polymer at the interface of the oil droplets decreases to decrease the compactness of the thermoplastic resin constituting the shell of the resultant microspheres. The upper limit of the total phosphoric acid value of the monomer (B) is preferably 40%, more preferably 35%, and further more preferably 30%. On the other hand, the lower limit of the total phosphoric acid value of the monomer (B) is preferably 1%, more preferably 2%, and further more preferably 3%. The "total phosphoric acid value of the monomer (B)" in the present invention means the value obtained by measuring the concentration of phosphorus atoms in the monomer (B) in an analysis with inductively coupled plasma (ICP), and converting the amount of phosphorus atoms into the obtained concentration of total phosphoric acid ($P_2O_5$) based on the atomic weight of phosphorus and the molecular weight of phosphoric acid. In the conversion, the atomic weights of phosphorus and oxygen are defined as 31 and 16 respectively.

The monomer (B) includes, for example, phosphonate monomers and their salts, such as vinyl phosphonate and ammonium allyl phosphonate; phosphate monomers and their salts, such as lithium isopentenyl phosphate, dimethylammonium phosphate ammonium salt, methacrylic acid 2-hydroxy ethyl phosphate ester, bis-2-(methacryloyloxy) ethyl phosphate, 2-(phosphonoxy)ethyl (meth)acrylate, polyoxyethylene alkylether phosphate ester, acidphosphoxy polyoxyethylene glycol monomethacrylate, 3-chloro-2-acidphophoxy propyl methacrylate, acidphosphoxy polyoxypropylene glycol monomethacrylate, and dimethyl aminoethyl methacrylate half salt of 2-methacryloyooxyethyl acid phosphate; and pyrophosphate monomers and their salts, such as lithium isopentenyl pyrophosphate, ammonium isopentenyl pyrophosphate and dimethyl ally pyrophosphate ammonium salt. One of or a combination of at least two of the monomers (B) can be used.

The commercially available monomers (B) include, for example, ADEKA REASOAP® PP-70 manufactured by Adeka Corporation; PHOSMER™ A, M, CL, PE, MH and PP manufactured by Uni-Chemical Co., Ltd.; and LIGHT ESTER P-IM manufactured by Kyoeisha Chemical Co., Ltd. One of or a combination of at least two of the monomers can be used.

The monomer (B) can also be an alkylene oxide adduct. An alkylene oxide adduct used as the monomer (B) can function as a dispersion-stabilizing auxiliary described below to improve the stability of the oil droplets of the oily mixture in the polymerization step.

If the monomer (B) is an alkylene oxide adduct, the alkylene oxide added the monomer (B) should have a carbon number preferably ranging from 2 to 5, more preferably from 2 to 4 and further more preferably from 2 to 3. The upper limit of the number of moles of the added alkylene oxide is preferably 100, more preferably 70 and further more preferably 50. The lower limit of the number of moles of the added alkylene oxide is preferably 1, more preferably 2 and further more preferably 3.

The total amount of the monomer (A) and the monomer (B) in the aqueous dispersion medium is not specifically restricted, and preferably ranges from 0.00001 to 10 parts by weight to 100 parts by weight of the oily mixture for attaining the effect of the present invention. A total amount of the monomer (A) and the monomer (B) beyond the above range can decrease the encapsulation efficiency of the blowing agent in the resultant microspheres. The upper limit of the total amount of the monomer (A) and the monomer (B) to 100 parts by weight of the oily mixture is preferably 5 parts by weight, more preferably 1 part by weight, further more preferably 0.5 parts by weight, and most preferably 0.1 part by weight. On the other hand, the lower limit of the total amount of the monomer (A) and the monomer (B) to 100 parts by weight of the oily mixture is preferably 0.00003 parts by weight, more preferably 0.00005 parts by weight, further more preferably 0.00007 parts by weight, and most preferably 0.0001 part by weight.

Furthermore, the total amount of the monomer (A) and the monomer (B) in the aqueous dispersion medium is not specifically restricted, and preferably ranges from 0.000015 to 15 parts by weight to 100 parts by weight of the polymerizable component for attaining the effect of the present invention. A total amount of the monomer (A) and the monomer (B) beyond the range mentioned above can increase the escape of the blowing agent from the resultant microspheres during storage at high temperature. The upper limit of the total amount of the monomer (A) and the monomer (B) to 100 parts by weight of the polymerizable component is preferably 8 parts by weight, more preferably 1.5 parts by weight, further more preferably 0.8 parts by weight, and most preferably 0.5 parts by weight. On the other hand, the lower limit of the total amount of the monomer (A) and the monomer (B) to 100 parts by weight of the polymerizable component is preferably 0.00007 parts by weight, more preferably 0.0001 part by weight, further more preferably 0.00015 parts by weight, and most preferably 0.0002 parts by weight.

The embodiment of the monomer (A) and/or the monomer (B) in the aqueous dispersion medium is not specifically restricted, and is preferably the monomer (A) or the monomer (B), and more preferably the monomer (A).

If the aqueous dispersion medium contains both the monomer (A) and the monomer (B), the weight ratio of the monomer (A) to the monomer (B) ((A):(B)) is not specifically restricted, and preferably ranges from 1:99 to 99:1. A ratio (A):(B) of 99:1 or smaller can increase the encapsulation efficiency of the blowing agent in the resultant microspheres, and a ratio (A):(B) of 1:99 or greater can prevent the escape of the blowing agent from the resultant microspheres during storage at high temperature. The upper limit of the weight ratio of the monomer (A) to the monomer (B) is preferably 95:5, more preferably 90:10 and further more preferably 85:15. On the other hand the lower limit of the weight ratio of the monomer (A) to the monomer (B) is preferably 5:95, more preferably 10:90 and further more preferably 15:85.

In the production process of the present invention, the monomer (A) and/or the monomer (B) can also be contained in the oil droplets. The oil droplets containing the monomer (A) and/or the monomer (B) are preferable with respect to adjusting the polarity of the thermoplastic resin constituting the shell of the resultant heat-expandable microspheres.

The monomer (A) and/or the monomer (B) can be contained in the polymerizable component. The monomer (A) and/or the monomer (B) are preferably contained in both the polymerizable component and the oil droplets containing the polymerizable component and blowing agent. This is because such a situation can improve the reproducibility of heat-expandable microspheres in the production process. The total amount the monomer (A) and the monomer (B) in the polymerizable component is not specifically restricted and preferably ranges from 0.002 to 5 wt %. The upper limit of the total amount of the monomer (A) and the monomer (B) is preferably 2 wt %, more preferably 1 wt %, further more preferably 0.8 wt %, and most preferably 0.06 wt %. On the other hand, the lower limit of the total amount of the monomer (A) and/or the monomer (B) is preferably 0.004 wt %, more preferably 0.006 wt %, further more preferably 0.008 wt %, and most preferably 0.01 wt %.

The embodiment of the monomer (A) and/or the monomer (B) in the polymerizable component is not specifically restricted, and is preferably the monomer (A) or the monomer (B), and more preferably the monomer (A).

The aqueous dispersion medium of the process of the present invention can further contain a dispersion-stabilizing auxiliary. The dispersion-stabilizing auxiliary includes water-soluble polymers; surfactants, such as cationic surfactants, anionic surfactants, amphoteric surfactants, and nonionic surfactants; and chelating agents. One of or a combination of at least two of those dispersion-stabilizing auxiliaries can be used. The dispersion-stabilizing auxiliary includes, for example, condensation products of diethanol amine and aliphatic dicarboxylic acids, condensation products of urea and formaldehyde, polyethylene oxide, methyl cellulose, polyvinyl alcohol, polyvinyl pyrolidone, copolymers of polyester and polyethylene glycol, sorbitan ester, sodium lauryl sulfate and sodium dodecylbenzene sulfonate.

The amount of the dispersion-stabilizing auxiliary in the aqueous dispersion medium is not specifically restricted, and preferably ranges from 0.01 to 5 parts by weight to 100 parts by weight of the oily mixture. An amount of the dispersion-stabilizing auxiliary beyond the range described above can cause an unstable dispersion of the oil droplets of the oily mixture in the aqueous dispersion medium during the polymerization step and can lead to agglomeration of the oil droplets and polymerized product. The upper limit of the amount of the dispersion-stabilizing auxiliary is preferably 4 parts by weight and more preferably 3 parts by weight. On the other hand, the lower limit of the amount of the dispersion-stabilizing auxiliary is preferably 0.015 parts by weight and more preferably 0.02 parts by weight.

The aqueous dispersion medium for the process of the present invention can further contain an electrolyte. The electrolyte includes, for example, sodium chloride, magnesium chloride, calcium chloride, sodium sulfate, magnesium sulfate, ammonium sulfate and sodium carbonate. One of or a combination of at least two of these electrolytes can be used. The amount of the electrolyte in the aqueous dispersion medium is not specifically restricted, and preferably ranges from 0.1 to 50 parts by weight to 100 parts by weight of the aqueous dispersion medium.

The aqueous dispersion medium for the process of the present invention can further contain at least one water-soluble compound selected from among water-soluble 1,1-substitution compounds having a carbon atom bonded with a heteroatom and with a hydrophilic functional group selected from hydroxyl group, carboxylic acid (salt) groups and phosphonic acid (salt) groups, potassium dichromate, alkali metal nitrite salts, metal (III) halides, boric acid, water-soluble ascorbic acids, water-soluble polyphenols, water-soluble vitamin Bs, and water-soluble phosphonic acids and phosphonate salts.

The amount of the water-soluble compound contained in the aqueous dispersion medium is not specifically restricted, and preferably ranges from 0.0001 to 1.0 part by weight to 100 parts by weight of the polymerizable component. An amount of the water-soluble compound lower than 0.0001 parts by weight cannot attain a sufficient effect by the compound. On the other hand, an amount higher than 1.0 parts by weight can decrease the polymerization rate or increase the residue of the monomers used for the polymerization. The upper limit of the amount of the water-soluble compound is preferably 0.1 parts by weight and more preferably 0.05 parts by weight. On the other hand, the lower limit of the amount of the water-soluble compound is preferably 0.0003 parts by weight and more preferably 0.001 parts by weight.

The aqueous dispersion medium for the process of the present invention essentially contains the fine particles of an inorganic compound described above and the monomer (A) and/or the monomer (B) described above, and can optionally contain the dispersion-stabilizing auxiliary, electrolyte and water-soluble compound described above. The aqueous dispersion medium can be prepared by adding the monomer (A) and/or the monomer (B) during preparation of the colloid of the fine particles of an inorganic compound described above, or can be prepared by mixing a prepared aqueous dispersion medium containing the fine particles of an inorganic compound and the monomer (A) and/or the monomer (B).

In the polymerization step of the process of the present invention, the aqueous dispersion medium can be acidic, neutral, or basic according to the type of the fine particles of an inorganic compound used, and can have a pH sufficient to disperse the fine particles of the inorganic compound and maintain the particles insoluble or hardly soluble in water.

The pH of the aqueous dispersion medium is not specifically restricted and preferably ranges from 6 to 12. A pH of the aqueous dispersion medium beyond the range can cause unstable dispersion-stabilizing function of the fine particles of an inorganic compound and unstable dispersion of the oil droplets of the polymerizable component and blowing agent so as to disturb the production of heat-expandable microspheres. A pH of the aqueous dispersion medium higher than 12 can cause hydrolysis of the shell of resultant heat-expandable microspheres to allow the blowing agent to escape from the microspheres and decrease the expansion ratio of the microspheres. The upper limit of the pH of the aqueous dispersion medium is preferably 11.8, more preferably 11.5, and further more preferably 11. On the other hand, the lower limit of the pH of the aqueous dispersion medium is preferably 7, more preferably 7.5, further more preferably 8, and most preferably 8.5.

The preferable pH of the aqueous dispersion medium can depend on the type of the inorganic compound. For example, the fine particles of magnesium hydroxide used as the metal compound are insoluble in the aqueous dispersion medium having a pH higher than a value of about 9.0 to 9.5 and start to disperse in the medium. Thus, the pH of the aqueous dispersion medium in this case preferably ranges from 9 to 12, more preferably from 9.2 to 11.5, further more preferably from 9.4 to 11, and most preferably from 9.5 to 10.5. The fine particles of calcium phosphate used as the metal compound uniformly disperse in the aqueous dispersion medium having a pH higher than about 6 to exert their effect as a dispersion stabilizer. Thus, the pH of the aqueous dispersion medium in this case preferably ranges from 6 to 12, more preferably from 8 to 11, and further more preferably from 9 to 10.5.

In the process of the present invention, the polymerizable component essentially containing a monomer component and optionally containing a cross-linking agent; the blowing agent; the aqueous dispersion medium essentially containing water, fine particles of an inorganic compound functioning as a dispersion stabilizer and the monomer (A) and/or the monomer (B) and optionally containing other components, such as a dispersion-stabilizing auxiliary, water-soluble compound and electrolyte; and other components, such as a polymerization initiator are mixed and the polymerizable component is polymerized. The order in which those components are mixed is not specifically restricted, and the components soluble or dispersible in the aqueous dispersion medium can be mixed in the aqueous dispersion medium before mixing with other components.

In the process of the present invention, the oil droplets of the oily mixture containing the polymerizable component and blowing agent are dispersed and suspended in the aqueous dispersion medium to form into oil globules of a prescribed particle size.

The methods for dispersing and suspending the oily mixture include generally known dispersion methods, such as agitation with a Homo-mixer (for example, a device manufactured by Primix Corporation) and a Homo-disper (for example, a device manufactured by Primix Corporation), dispersion with a static dispersing apparatus such as a Static mixer (for example, a device manufactured by Noritake Engineering Co., Ltd.), membrane emulsification technique, ultrasonic dispersion and microchannel dispersion.

Then, suspension polymerization is initiated by heating the dispersion in which the oily mixture is dispersed into oil globules in the aqueous dispersion medium. During the polymerization reaction, the dispersion is preferably agitated gently to prevent floating of monomers and sedimentation of polymerized heat-expandable microspheres.

The polymerization temperature can optionally be set depending on the type of the polymerization initiator, and is preferably controlled within a range from 30 to 100° C., more preferably from 40 to 90° C., and further more preferably from 50 to 85° C. The polymerization temperature is preferably maintained for about 0.1 to 20 hours. The initial pressure for the polymerization is not specifically restricted, and is preferably controlled within a range from 0 to 5.0 MPa, more preferably from 0.1 to 3.0 MPa and further more preferably from 0.2 to 2.0 MPa in gauge pressure.

The resultant heat-expandable microspheres are isolated from the polymerization mixture using a method including, for example, suction filtration, pressure filtration and centrifugal separation, and a wet cake of the heat-expandable microspheres is thus obtained.

In the process of the present invention, the polymerization step described above can be followed by a pH-decreasing step and a water washing step described below.

pH-Decreasing Step

In the pH-decreasing step, the heat-expandable microspheres obtained in the polymerization step described above undergo pH-decreasing treatment. The fine particles of an inorganic compound adhering to the surface of the heat-expandable microspheres obtained in the polymerization step are easily removed by the pH-decreasing treatment and clean heat-expandable microspheres are obtained.

The pH-decreasing treatment is not specifically restricted so far as an acidic or basic substance is contacted to the heat-expandable microspheres obtained in the polymerization step to decrease their pH. The acidic substance includes, for example, inorganic acids, such as hydrochloric acid (hydrogen chloride), sulfuric acid, nitric acid, phosphoric acid, and perchloric acid; and organic acids including carboxylic acids, such as acetic acid, butyric acid, citric acid, and ascorbic acid. One of or a combination of at least two of the acidic substances can be used. The basic substance includes, for example, hydroxides of alkali (earth) metals, such as sodium hydroxide and potassium hydroxide; ammonia; and carbonate salts, such as sodium hydrogen carbonate and sodium carbonate. One of or a combination of at least two of the basic substances can be used.

The pH-decreasing step can include, for example, the steps 1) and 2) described below:

1) A step of mixing the polymerization mixture and an acidic or basic substance,
2) A step of mixing heat-expandable microspheres isolated from the polymerization mixture and an acidic or basic substance.

In the step 2), the heat-expandable microspheres and an acidic or basic substance can be mixed in the presence of water that is separately prepared.

In the case that an acidic substance is used in the pH-decreasing step, the pH of the mixture containing heat-expandable microspheres and the acidic substance is not specifically restricted and is preferably 8 or lower and more preferably 7 or lower. In the case that a basic substance is used in the pH-decreasing step, the pH of the mixture containing heat-expandable microspheres and the basic substance preferably ranges from 8 to 12 and more preferably from 9 to 11.

The heat-expandable microspheres after the pH-decreasing step are isolated in the same manner as described above, and a wet cake of the heat-expandable microspheres is obtained.

Water Washing Step

The heat-expandable microspheres obtained after the polymerization step or pH-decreasing step are processed into clean heat-expandable microspheres by washing with water (herein after referred to as a water washing step) where fine particles of a metal compound are removed. Cleaner heat-expandable microspheres can be obtained by water-washing the heat-expandable microspheres after the pH-decreasing step.

The water washing step is carried out, for example, by contacting the wet cake of heat-expandable microspheres with water at least one time. The water used for the washing includes, for example, tap water, deionized water, distilled water, and ultra-pure water.

The water washing step can include, for example, the steps A) and B) described below.

A) A step of washing the wet cake of heat-expandable microspheres with water during isolation of the microspheres by suction filtration, pressure filtration or centrifugal separation.
B) A step of washing heat-expandable microspheres or the wet cake of heat-expandable microspheres with water by re-dispersing the microspheres thus obtained in water that is separately prepared.

The step A) is carried out, for example, by showering water onto the wet cake of heat-expandable microspheres. In the step B), one-time re-dispersion of heat-expandable microspheres is effective enough although repeated re-dispersion achieves a better washing effect.

The amount of water used in the water washing step is not specifically restricted, and is preferably at least 100 parts by weight and more preferably at least 200 parts by weight to 100 parts by weight of heat-expandable microspheres.

The resultant heat-expandable microspheres (usually the wet cake of heat-expandable microspheres) are dried in a tray drier, vacuum drier, flash drier or Nauta drier at a temperature lower than the expansion-starting temperature of the heat-expandable microspheres so as to be processed into dried heat-expandable microspheres.

Heat-Expandable Microspheres

The heat-expandable microspheres of the present invention contain a thermoplastic resin shell 11 and a blowing agent (core) 12 encapsulated therein and vaporizable by heating as shown in FIG. 1. The heat-expandable microspheres have a core-shell structure, and the whole of a microsphere is thermally expandable (a microsphere wholly expandable by heating).

The heat-expandable microspheres of the present invention are produced, for example, in the process described above, although the production method of the heat-expandable microspheres is not restricted within the range of the process.

The thermoplastic resin constituting the shell of the heat-expandable microspheres is a polymer containing polymerizable unsaturated monomer units. The polymerizable unsaturated monomer units include the polymerizable unsaturated monomer unit (a) and/or the polymerizable unsaturated monomer unit (b) (hereinafter the polymerizable unsaturated monomer unit (a) may also be referred to as the monomer unit (a) and the polymerizable unsaturated monomer unit (b) as the monomer unit (b)) described below.

Polymerizable unsaturated monomer unit (a): Ethylenically unsaturated monomer unit having a total sulfuric acid value ranging from more than 0% to 35%.

Polymerizable unsaturated monomer unit (b): Ethylenically unsaturated monomer unit having a total phosphoric acid value ranging from more than 0% to 50%.

The polymerizable unsaturated monomer unit containing the polymerizable unsaturated monomer unit (a) and/or the polymerizable unsaturated monomer unit (b) are considered to impart proper polarity to the resultant thermoplastic resin and prevent excessive plasticization of the resin in heating. Thus, the blowing agent is efficiently encapsulated in the heat-expandable microspheres and is prevented from escaping out of the microspheres during storage at high temperature.

The monomer unit (a) and the monomer unit (b) are polymerizable unsaturated monomer units produced by respectively polymerizing the above-mentioned monomer (A) and monomer (B).

The monomer unit (a) has at least one type of group selected from the group consisting of sulfate group, sulfonate group and the groups of their salts. The salts of sulfate group and sulfonate group include, for example, metal salts, such as sodium salts and potassium salts, and ammonium salts.

The total sulfuric acid value of the monomer unit (a) ranges from more than 0% to 35%. If the total sulfuric acid value of the monomer unit (a) is higher than 35%, the resultant thermoplastic resin constituting the shell of heat-expandable microspheres has excessively high polarity and exhibits increased plasticization behavior in heating. The upper limit of the total sulfuric acid value of the monomer unit (a) is preferably 30%, more preferably 25%, further more preferably 20%, and yet further more preferably 15%. On the other hand, the lower limit of the total sulfuric acid of the monomer unit (a) is preferably 0.1%, more preferably 0.3%, further more preferably 0.5%, and yet further more preferably 1%. The "total sulfuric acid value of the monomer unit (a)" in the present invention means the value obtained by measuring the concentration of sulfur atoms contained in the monomer (A) constituting the monomer unit (a) in an analysis with inductively coupled plasma (ICP) in the same manner as described above and converting the obtained concentration of total sulfur atoms into the amount of sulfuric acid ($SO_3$) based on the atomic weight of sulfur and the molecular weight of sulfuric acid. In the conversion, the atomic weights of sulfur and oxygen are defined as 32 and 16 respectively.

The monomer unit (a) can have an aromatic ring in its molecule. The monomer unit (a) having an aromatic ring in its molecule is preferable for further improving the encapsulation ratio of the blowing agent in the resultant heat-expandable microspheres.

The monomer unit (a) can have alkylene oxides added to its molecule. The monomer unit (a) having alkylene oxides added to its molecule is preferable for adjusting the polarity of the resultant thermoplastic resin more effectively. The carbon number of the alkylene oxide added to the molecule of the monomer unit (a) preferably ranges from 2 to 5, more preferably from 2 to 4, and further more preferably from 2 to 3. The number of moles of the added alkylene oxide preferably range from 1 to 100, more preferably from 2 to 70, and further more preferably from 3 to 50.

The monomer unit (b) has at least one type of group selected from the group consisting of phosphate group, phosphonate group, pyrophosphate group and the groups of their salts. The salts of phosphate group, phosphonate group and pyrophosphate group include, for example, metal salts, such as sodium salts and potassium salts, and ammonium salts.

The total phosphoric acid value of the monomer unit (b) ranges from more than 0% to 50%. If the total phosphoric acid value of the monomer unit (b) is higher than 50%, the resultant thermoplastic resin constituting the shell of heat-expandable microspheres has excessively high polarity and exhibits increased plasticization behavior in heating. The upper limit of the total phosphoric acid value of the monomer unit (b) is preferably 40%, more preferably 35%, and further more preferably 30%. On the other hand, the lower limit of the total phosphoric acid value of the monomer unit (b) is preferably 1%, more preferably 2%, and further more preferably 3%. The "total phosphoric acid value of the monomer unit (b)" in the present invention means the value obtained by measuring the concentration of phosphorus atoms contained in the monomer (B) constituting the monomer unit (b) in an analysis with inductively coupled plasma (ICP) in the same manner as described above and converting the obtained concentration of total phosphorus atoms into the amount of phosphoric acid ($P_2O_5$) based on the atomic weight of phosphorus and the molecular weight of phosphoric acid. In the conversion, the atomic weights of phosphorus and oxygen are defined as 31 and 16 respectively like as that described above.

The monomer unit (b) can have alkylene oxides added to its molecule. The monomer unit (b) having alkylene oxides added to its molecule is preferable for adjusting the polarity of the resultant thermoplastic resin more effectively. The carbon number of the alkylene oxide added to the molecule of the monomer unit (b) preferably ranges from 2 to 5, more preferably from 2 to 4, and further more preferably from 2 to 3. The number of moles of the added alkylene oxide preferably ranges from 1 to 100, more preferably from 2 to 70, and further more preferably from 3 to 50.

The total amount the monomer (a) and the monomer (b) in the polymerizable unsaturated monomer unit is not specifically restricted and preferably ranges from 0.00001 to 20 wt %. A total amount the monomer (a) and the monomer (b) beyond the above range can decrease the encapsulation efficiency of the blowing agent in the resultant microspheres. The upper limit of the total amount of the monomer (a) and the monomer (b) is preferably 15 wt %, more preferably 10 wt %, further more preferably 5 wt %, and most preferably 3 wt %. On the other hand, the lower limit of the total amount of the monomer (a) and the monomer (b) is preferably 0.00004 wt %, more preferably 0.00006 wt %, further more preferably 0.00008 wt %, and most preferably 0.0001 wt %.

The embodiment of the monomer unit (a) and/or the monomer unit (b) in the polymerizable unsaturated monomer unit is not specifically restricted, and is preferably the monomer unit (a) or the monomer unit (b), and more preferably the monomer unit (a).

If the polymerizable unsaturated monomer unit contains the monomer unit (a) and the monomer unit (b), the weight ratio of the monomer unit (a) to the monomer unit (b) ((a):(b)) is not specifically restricted and preferably ranges from 1:99 to 99:1. A ratio (a):(b) of 99:1 or smaller can increase the encapsulation efficiency of the blowing agent in the resultant microspheres and a ratio (a):(b) of 1:99 or greater can prevent the escape of the blowing agent from the resultant microspheres during storage at high temperature. The upper limit of the weight ratio of the monomer unit (a) to the monomer unit (b) is preferably 95:5, more preferably 90:10 and further more preferably 85:15. On the other hand the lower limit of the weight ratio of the monomer unit (a) to the monomer unit (b) is preferably 5:95, more preferably 10:90 and further more preferably 15:85.

The thermoplastic resin constituting the shell of the heat-expandable microspheres of the present invention is also a polymer of a polymerizable component essentially containing a monomer and optionally containing a crosslinking agent as described above. The polymerizable unsaturated monomer units contained in the polymer further contain the polymerizable unsaturated monomer units produced by polymerizing the monomer (and the crosslinking agent) contained in the polymerizable component.

The polymerizable unsaturated monomer unit preferably contains nitrile monomer units produced by polymerizing the above nitrile monomers. The amount of the nitrile monomer units in the polymerizable unsaturated monomer unit is not specifically restricted, and preferably ranges from 5 to 99.99999 wt %. An amount of the nitrile monomer units smaller than 5 wt % can cause low heat resistance of the resultant microspheres. On the other hand, an amount of the nitrile monomer units greater than 99.99999 wt % can cause low expansion performance of the resultant microspheres. The upper limit of the amount of the nitrile monomer units is preferably 99 wt %, more preferably 95 wt %, further more preferably 90 wt %, and most preferably 85 wt %. On the other hand, the lower limit of the amount of the nitrile monomer units is preferably 10 wt %, more preferably 15 wt %, and further more preferably 20 wt %.

If the nitrile monomer units contain acrylonitrile (AN) and methacrylonitrile (MAN), the weight ratio of acrylonitrile to methacrylonitrile (AN:MAN) is not specifically restricted, and is preferably within the range described above for the nitrile monomer.

The polymerizable unsaturated monomer unit which contains vinylidene chloride units produced by polymerizing the above vinylidene chloride contributes to an improved gas barrier effect of the resultant heat-expandable microspheres. The polymerizable unsaturated monomer unit which contains a (meth)acrylate ester monomer unit produced by polymerizing the above (meth)acrylate ester monomers and/or a styrene monomer unit produced by polymerizing the above styrene monomers contributes to a more adjustable thermal expansion performance of the resultant heat-expandable microspheres. The polymerizable unsaturated monomer unit which contains a (meth)acryl amide monomer unit produced by polymerizing (meth)acryl amide monomers improves the heat resistance of the resultant heat-expandable microspheres.

The amount of the at least one monomer unit selected from the group consisting of vinylidene chloride unit, (meth)acrylate ester monomer unit, (meth)acrylamide monomer unit, maleimide monomer unit and styrene monomer unit is preferably 90 wt % or lower of the polymerizable monomer unit, more preferably 85 wt % or lower and further more preferably 80 wt % or lower. An amount of the at least one monomer unit higher than 90 wt % can decrease the heat resistance of the resultant heat-expandable microspheres.

The polymerizable unsaturated monomer unit which contains the carboxyl-group-containing monomer units produced by polymerizing the above carboxyl-group-containing monomers is preferable for high heat resistance and solvent resistance of the resultant heat-expandable microspheres.

The amount of the carboxyl-group-containing monomer units in the polymerizable unsaturated monomer unit is not specifically restricted and preferably ranges from 10 to 70 wt %. An amount of the carboxyl-group-containing monomer units lower than 10 wt % cannot attain sufficient heat resistance of the resultant heat-expandable microspheres. On the other hand, an amount of the carboxyl-group-containing monomer units higher than 70 wt % can decrease the gas barrier effect of the resultant heat-expandable microspheres. The upper limit of the amount of the carboxyl-group-containing monomer units in the polymerizable unsaturated monomer unit is preferably 60 wt %, more preferably 50 wt %, and further more preferably 45 wt %. On the other hand, the lower limit of the amount of the carboxyl-group-containing monomer unit in the polymerizable unsaturated monomer unit is preferably 15 wt %, more preferably 20 wt %, and further more preferably 25 wt %.

If the polymerizable unsaturated monomer unit contains nitrile monomer units and carboxyl-group-containing monomer units, the total amount of the nitrile monomer units and carboxyl-group-containing monomer units in the polymerizable unsaturated monomer unit is not specifically restricted, and is preferably at least 50 wt %, more preferably at least 60 wt %, further more preferably at least 70 wt %, and yet further more preferably at least 80 wt %.

The amount of the carboxyl-group-containing monomer units in the total amount of the carboxyl-group-containing monomer units and nitrile monomer units is preferably within the range described above (the amount of the carboxyl-group-containing monomer in the total amount of the carboxyl-group-containing monomer and nitrile monomer).

The polymerizable unsaturated monomer unit can contain a crosslinker monomer unit produced by polymerizing the above crosslinking agent. The amount of the crosslinker monomer unit in the polymerizable unsaturated monomer unit is not specifically restricted, and preferably ranges from 0.01 to 8 wt %, more preferably from 0.1 to 5 wt % and further more preferably from 0.15 to 3 wt %.

The mean particle size of the heat-expandable microspheres is not specifically restricted, and preferably ranges from 1 to 200 μm, more preferably from 2 to 100 μm, further more preferably from 3 to 75 μm, and yet further more preferably from 4 to 50 μm. The heat-expandable microspheres having an average particle size smaller than 1 μm can have a thin shell that can cause easy escape of the blowing agent. On the other hand, the heat-expandable microspheres having an average particle size larger than 200 μm can have a shell of nonuniform thickness that disturbs good thermal expansion performance of the microspheres.

The coefficient of variation, CV, of the particle size distribution of the heat-expandable microspheres is not specifically restricted, and is preferably not greater than 50%, more preferably not greater than 40% and further more preferably not greater than 30%. The CV can be calculated by the following formulae (1) and (2).

$$CV = (s/\langle x\rangle) \times 100\ (\%) \tag{1}$$

$$s = \left\{ \sum_{j=1}^{n} \left((xi - \langle x\rangle)^2/(n-1)\right) \right\}^{1/2} \tag{2}$$

(where s is a standard deviation of the particle size of the microspheres, <x> is a mean particle size of the microspheres, "xi" is the particle size of the i-th microsphere, and n represents the number of microspheres).

The encapsulation ratio of the blowing agent in the heat-expandable microspheres is not specifically restricted, and preferably ranges from 1 to 50 wt %. An encapsulation ratio of the blowing agent within the above range can prevent the escape of the blowing agent and enable the heat-expandable microspheres to expand to a large extent. The upper limit of the encapsulation ratio of the blowing agent is preferably 40 wt %, more preferably 35 wt %, and further more preferably 30 wt %. On the other hand, the lower limit of the encapsulation ratio of the blowing agent is preferably 5 wt % and more preferably 10 wt %.

The encapsulation ratio of the blowing agent is determined by the procedure described in the Example below.

The expansion-starting temperature (Ts) of the heat-expandable microspheres is not specifically restricted, and preferably ranges from 60 to 300° C. for attaining the effect of the present invention. The upper limit of the expansion-starting temperature is preferably 250° C., more preferably 200° C., further more preferably 180° C., and most preferably 150° C. On the other hand, the upper limit of the expansion-starting temperature is preferably 65° C., more preferably 70° C., and further more preferably 80° C.

The maximum expansion temperature ($T_{max}$) of the heat-expandable microspheres is not specifically restricted, and preferably ranges from 80° C. to 350° C. for attaining the effect of the present invention. The upper limit of the maximum expansion temperature is preferably 300° C., more preferably 250° C., and further more preferably 200° C. On the other hand, the lower limit of the maximum expansion temperature is preferably 90° C., more preferably 95° C., and further more preferably 100° C.

The expansion-starting temperature (Ts) and the maximum expansion temperature ($T_{max}$) of the heat-expandable microspheres are determined by the procedures described in the Example.

The maximum expansion ratio of the heat-expandable microspheres is not specifically restricted, and is preferably at least 30 times for attaining the effect of the present invention. The lower limit of the maximum expansion ratio of the heat-expandable microspheres is preferably 50 times, more preferably 80 times, further more preferably 100 times and most preferably 150 times. On the other hand, the upper limit of the maximum expansion ratio of the heat-expandable microspheres is preferably 500 times. The maximum expansion ratio of the heat-expandable microspheres is determined by the procedure described in the Example.

Hollow Particles

The hollow particles of the present invention are manufactured by thermally expanding the heat-expandable microspheres and/or the heat-expandable microspheres produced in the process mentioned above. The hollow particles are lightweight and exhibit excellent material properties when contained in a composition or formed product.

The hollow particles of the present invention are manufactured by thermally expanding the heat-expandable microspheres and/or the heat-expandable microspheres produced in the process mentioned above at a temperature preferably within a range of from 50 to 400° C. The thermal expansion process is not specifically restricted, and either dry thermal expansion or wet thermal expansion can be employed.

The mean particle size of the hollow particles can be optionally designed according to their application and is not specifically restricted, although the mean particle size preferably ranges from 1 to 1000 μm. The upper limit of the mean particle size of the hollow particles is preferably 500 μm and more preferably 300 μm. On the other hand, the lower limit of the mean particle size of the hollow particles is preferably 5 μm and more preferably 10 μm.

The coefficient of variation, CV, of the particle size distribution of the hollow particles is not specifically restricted, and is preferably not greater than 50%, more preferably not greater than 40%, and further more preferably not greater than 30%.

The true specific gravity of the hollow particles is not specifically restricted, and preferably ranges from 0.001 to 0.6 for attaining the effect of the present invention. The hollow particles having a true specific gravity within the above range efficiently reduce the weight per unit volume of the composition and formed products containing the particles. The upper limit of the true specific gravity of the hollow particles is preferably 0.4 and more preferably 0.3. On the other hand, the lower limit of the true specific gravity of the hollow particles is preferably 0.0015 and more preferably 0.002.

Figure 2:
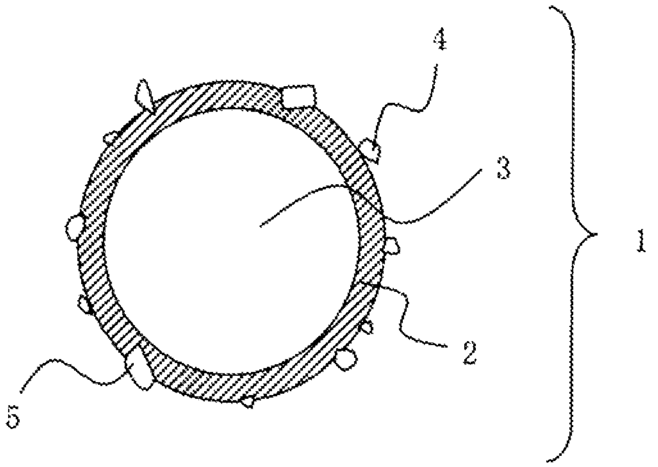
FIG. 2 is a schematic diagram of an example of the hollow particles of the present invention.

As shown in FIG. 2, the hollow particles (1) can contain the particulate material (4 and 5) coating the outer surface of the shell (2) of the particles, and such particles may also be referred to as particulate-coated hollow particles.

The coating mentioned herein means that the particulate material (4 and 5) is in a state of adhesion (the state of the particulate 4 in FIG. 2) on the outer surface of the shell 2 of the particulate-coated hollow particles, or in a state of fixation (the state of the particulate 5 in FIG. 2) in a dent on the outer surface of the shell as the result of the particulate material pushing into the thermoplastic shell softened or melted by heating. The shape of the particulate material can be irregular or spherical.

The particulate material coating the hollow particles prevents scattering of the hollow particles to improve their handling property and improves their dispersibility in a base component, such as binders and resins.

The particulate material can be selected from various materials including both inorganic and organic materials. The shape of the particulate material includes spherical, needle-like, and plate-like shapes.

The inorganic compounds constituting the particulate material are not specifically restricted, and include, for example, wollastonite, sericite, kaolin, mica, clay, talc, bentonite, aluminum silicate, pyrophyllite, montmorillonite, calcium silicate, calcium carbonate, magnesium carbonate, dolomite, calcium sulfate, barium sulfate, glass flake, boron nitride, silicon carbide, silica, alumina, isinglass, titanium dioxide, zinc oxide, magnesium oxide, hydrotalcite, carbon black, molybdenum disulfide, tungsten disulfide, ceramic beads, glass beads, crystal beads and glass microballoons.

The organic compounds constituting the particulate material are not specifically restricted, and include, for example, sodium carboxymethyl cellulose, hydroxyethyl cellulose, methyl cellulose, ethyl cellulose, nitro cellulose, hydroxypropyl cellulose, sodium alginate, polyvinyl alcohol, polyvinyl pyrolidone, sodium polyacrylate, carboxyvinyl polymer, polyvinyl methyl ether, magnesium stearate, calcium stearate, zinc stearate, polyethylene wax, lauric amide, myristic amide, palmitic amide, stearic amide, hydrogenated castor oil, (meth)acrylic resin, polyamide resin, silicone resin, urethane resin, polyethylene resin, polypropylene resin and fluorine resin.

The inorganic and organic compounds constituting the particulate material can be surface-treated with a surface-treatment agent, such as a silane coupling agent, paraffin wax, fatty acid, resin acid, urethane compound and fatty acid ester, or are not surface-treated.

The mean particle size of the particulate material is not specifically restricted, and preferably ranges from 0.001 to 30 μm, more preferably from 0.005 to 25 μm and further more preferably from 0.01 to 20 μm.

The ratio of the mean particle size of the particulate material to the mean particle size of the hollow particles (the mean particle size of the particulate material: the mean particle size of the hollow particles) is preferably not higher than 1, more preferably not higher than 0.1 and further more preferably not higher than 0.05.

The amount of the particulate material in the particulate-coated hollow particles is not specifically restricted, and is preferably not higher than 95 wt %. An amount of the particulate material higher than 95 wt % can result in a high amount of the particulate-coated hollow particles that is required to be added to a composition and lead to an increased cost of the particulate-coated hollow particles. The upper limit of the amount of the particulate material is preferably 90 wt %, more preferably 85 wt % and further more preferably 80 wt %. On the other hand, the lower limit of the percentage of the particulate material is preferably 20 wt % and more preferably 40 wt %.

The true specific gravity of the particulate-coated hollow particles is not specifically restricted, and preferably ranges from 0.01 to 0.6 for attaining the effect of the present invention. The particulate-coated hollow particles having a true specific gravity within the above range tend to efficiently impart the properties given by the hollow particles to the composition and formed products.

The upper limit of the true specific gravity of the particulate-coated hollow particles is preferably 0.3 and more preferably 0.2. On the other hand, the lower limit of the true specific gravity of the particulate-coated hollow particles is preferably 0.05 and more preferably 0.1.

The particulate-coated hollow particles are prepared, for example, by thermally expanding particulate-coated heat-expandable microspheres. The preferable process for manufacturing the particulate-coated hollow particles include the step of mixing heat-expandable microspheres and a particulate material (mixing step), and the step of heating the mixture obtained in the mixing step at a temperature higher than the softening temperature described above to expand the heat-expandable microspheres and coat the outer surface of the resultant hollow particles with the particulate material (coating step).

Compositions and Formed Products

The composition of the present invention contains a base component and at least one selected from the group consisting of the above-described heat-expandable microspheres, the heat-expandable microspheres produced in the above-described process and the hollow particles described above.

The base component includes, for example, rubbers, such as natural rubbers, butyl rubber, silicone rubber and ethylene-propylene-diene rubber (EPDM); thermosetting resins, such as unsaturated polyester resins, epoxy resins and phenolic resins; waxes, such as polyethylene waxes and paraffin waxes; thermoplastic resins, such as ethylene-vinyl acetate copolymer (EVA), ionomers, polyethylene, polypropylene, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polyamide resin (nylon 6, nylon 66, etc.), polycarbonate, polyethylene terephthalate (PET), polybutylene terephthalate (PBT), polyacetal (POM) and polyphenylene sulfide (PPS); thermoplastic elastomers, such as olefin elastomers and styrene elastomers; bioplastics, such as polylactic acid (PLA), cellulose acetate, PBS, PHA and starch resins; sealing materials, such as silicones, modified silicones, polysulfides, modified polysulfides, urethanes, acrylates, polyisobutylenes and butyl rubbers; liquid ingredients including plastisols and emulsions of urethane polymers, ethylene-vinyl acetate copolymers, vinyl chloride polymers and acrylate polymers; inorganic materials, such as cement, mortar and cordierite; and organic fibers, such as cellulose fiber, kenaf, bran, aramid fiber, phenol fiber, polyester fiber, acrylic fiber, polyolefin fiber including polyethylene and polypropylene, polyvinyl alcohol fiber and rayon fiber. One of or a combination of at least two of those base components can be used.

The composition of the present invention is prepared by mixing the base component and at least one particulate substance (hereinafter also referred to as particulate substance) selected from the heat-expandable microspheres and hollow particles. The composition of the present invention can also be prepared by mixing another base component with the composition prepared by mixing the above-described base component and at least one particulate substance selected from the heat-expandable microspheres and hollow particles.

The composition of the present invention can contain other components according to its application in addition to the particulates and base component. Other components include, for example, inorganic powder materials, such as calcium carbonate, talc, titanium oxide, zinc white, clay, kaolin, silica and alumina; organic fine particles, such as acrylic fine particles, styrene fine particles, urethane fine particles and silicone fine particles; pigments, such as carbon black; fibers, such as glass fiber, carbon fiber and natural fibers; colorants, such as carbon black and titanium oxide; high-boiling-point organic solvents; flame retardants; adhesives, such as a mixture of at least one selected from the group consisting of polyamine, polyamide and polyol and a polyisocyanate prepolymer of which terminal NCO group is blocked by a proper blocking agent including oxime and lactam; and a chemical blowing agent. The amount of those components is selected according to the particular application.

The amount of the particulates in the composition of the present invention is not specifically restricted, and preferably ranges from 0.01 to 80 wt %. An amount of the particulates within the above range tends to efficiently reduce the weight per unit volume of the composition and formed product. The upper limit of the amount of the particulates is preferably 70 wt %, more preferably 60 wt %, further more preferably 50 wt % and most preferably 30 wt %. On the other hand, the lower limit of the amount of the particulates is preferably 0.05 wt %, more preferably 0.1 wt %, further more preferably 0.3 wt % and most preferably 0.5 wt %.

The procedure for preparing the composition of the present invention is not specifically restricted, and a known conventional procedure can be employed. The procedure includes, for example, uniform mixing with a machine, such as a Homo-mixer, Static mixer, Henschel mixer, tumbler mixer, planetary mixer, kneader, roller kneader, mixing roller, mixer, single screw extruder, twin screw extruder or multi-screw extruder.

The composition of the present invention includes, for example, a rubber composition, molding composition, paint composition, cray composition, adhesive composition, and powder composition.

The composition of the present invention can be a masterbatch for molding. The composition prepared as the masterbatch prevents the particulates from scattering in a molding operation and is manufactured into a molded product in which the particulates are dispersed uniformly. The base resin used for the masterbatch should preferably be a compound and/or thermoplastic resin having a melting point or softening point lower than the expansion-starting temperature of the heat-expandable microspheres or hollow particles. Such compound and/or thermoplastic resin includes, for example, waxes, such as polyethylene waxes and paraffin waxes; thermoplastic resins, such as ethylene-vinyl acetate copolymer (EVA), polyethylene, modified polyethylene, polypropylene, modified polypropylene, modified polyolefin, polyvinyl chloride (PVC), acrylic resin, thermoplastic polyurethane, acrylonitrile-styrene copolymer (AS resin), acrylonitrile-butadiene-styrene copolymer (ABS resin), polystyrene (PS), polycarbonate, polyethylene terephthalate (PET) and polybutylene terephthalate (PBT); ionomer resins, such as ethylene ionomers, urethane ionomers, styrene ionomers and fluorine ionomers; thermoplastic elastomers, such as olefin elastomers, styrene elastomers and polyester elastomers; and rubbers such as natural rubbers, isoprene rubber (IR), butadiene rubber (BR), styrene-butadiene rubber (SBR), chloroprene rubber (CR), nitrile rubber (NBR), butyl rubber, silicone rubber, acrylic rubber, urethane rubber, fluorine rubber and ethylene-propylene-diene rubber (EPDM)). The master batch composition for molding is preferably employed in injection molding, extrusion molding and press molding.

The formed product of the present invention is manufactured by forming or molding the composition described above. The formed product of the present invention includes, for example, coatings and molded products. The formed product of the present invention has a lightweight property, porosity, sound absorbency, thermal insulation, low thermal conductivity, permittivity-decreasing property, design potential, shock absorbing performance, strength, and chipping resistance, which have been efficiently improved.

The composition and formed product of the present invention contain at least one particulate substance selected from the above-described heat-expandable microspheres and hollow particles manufactured by expanding the heat-expandable microspheres and are lightweight.

EXAMPLES

Specific examples of the heat-expandable microspheres of the present invention are described below. However, the present invention is not restricted within the scope of those examples. In the Examples and Comparative Examples described below, "%" means "wt %" and "parts" means "parts by weight" unless otherwise specified.

The properties and performances of the heat-expandable microspheres in the example of production, Examples and Comparative Examples described below are determined or evaluated in the procedures described below. In the following description, heat-expandable microspheres may be referred to as "microspheres" for the sake of brevity.

Mean Particle Size

The mean particle size of microspheres was analyzed with a laser diffraction/scattering particle size distribution analyzer (Microtrac ASVR, manufactured by Nikkiso Co., Ltd.). The $D_{50}$ from the analysis was defined as the mean particle size.

The Expansion-Starting Temperature (Ts) and the Maximum Expansion Temperature ($T_{max}$) of Heat-Expandable Microspheres The expansion-starting temperature and the maximum expansion temperature was determined with a DMA (DMA Q800, manufactured by TA Instruments). In an aluminum cup 4.8 mm deep and 6.0 mm in diameter (5.65 mm in inner diameter), 0.5 mg of a sample of heat-expandable microspheres was placed, and the sample was covered with an aluminum lid (5.6 mm in diameter and 0.1 mm thick) to prepare a test sample. The test sample was set on the device and subjected to a pressure of 0.01 N from above with the compression unit of the device, and the height of the sample was measured. The sample was then heated by elevating the temperature at the rate of 10° C./min from 20 to 300° C., being subjected to the pressure of 0.01 N with the compression unit, and the change of the vertical height of the compression unit was measured. The temperature at which the vertical height of the unit started to increase was determined as the expansion-starting temperature (Ts) of the microspheres, and the temperature at which the compression unit indicated the highest position was determined as the maximum expansion temperature ($T_{max}$) of the microspheres.

Expansion Ratio of Heat-Expandable Microspheres

Heat-expandable microspheres and an aqueous emulsion of ethylene-vinyl acetate copolymer resin (an aqueous emulsion containing 55 wt % of the ethylene-vinyl acetate copolymer resin composed of 30 wt % of ethylene and 70 wt % of vinyl acetate) were prepared, and a paste composition was prepared by mixing the heat-expandable microspheres and the aqueous emulsion in which the ratio (solid ratio) of the heat-expandable microspheres to the ethylene-vinyl acetate copolymer resin was 1:9. The resultant paste composition was spread on a sheet of plain paper about 0.2 mm thick and dried at room temperature to make an EVA coat containing the heat-expandable microspheres. The thickness of the resultant EVA coat, $D_1$ (mm), was measured and the EVA coat on the plain paper was then heated in an oven at several temperature levels ranging from the expansion-starting temperature (Ts) to a temperature 100° C. higher than the maximum expansion temperature ($T_{max}$). The heating time at each temperature was 2 minutes and the thickness of the EVA coat, $D_2$ (mm), after heating at each temperature was measured. The expansion ratio, $R_{ex1}$, was calculated form $D_1$ (mm) and $D_2$ (mm) by the following formula (A):

$$R_{ex1} = D_2/D_1 \tag{A}$$

The highest value of the expansion ratio, Rex, was determined as the maximum expansion ratio, $R_{max1}$.

Encapsulation Ratio of the Blowing Agent

The moisture content of heat-expandable microspheres ($C_{w1}$, %) was determined with a Karl Fischer moisture meter (MKA-510N, manufactured by Kyoto Electronics Manufacturing Co., Ltd.). Then 1.0 g of the heat-expandable microspheres was placed in a stainless-steel evaporation dish of 80 mm in diameter and 15 mm deep and weighed ($W_1$, g). To the sample, 30 ml of acetonitrile was added to uniformly disperse the microspheres and the sample was kept still for 2 hours at room temperature. Then, the sample was dried at 110° C. for 2 hours and weighed ($W_2$, g). The encapsulation ratio of the blowing agent, $CR_2$ (wt %), was calculated by the following formula (B):

$$CR_2 = ((W_1 - W_2)/10) \times 100 - C_{w1} \tag{B}$$

Encapsulation Efficiency of Heat-Expandable Microspheres

The encapsulation efficiency of the blowing agent in heat expandable microspheres, Cel (%), was calculated by the following formula (C) from the theoretical encapsulation ratio of the blowing agent, $CR_1$ (wt %), and the encapsulation ratio of the blowing agent, $CR_2$ (wt %), calculated by the above formula (B):

$$C_{e1}(\text{wt }\%) = (CR_2/CR_1)\times 100 \tag{C}$$

The theoretical encapsulation ratio, $CR_1$, was calculated by the following formula (D) from the amount of the blowing agent, $W_3$ (g), and the amount of the oily mixture, $W_4$ (g), both charged in the polymerization step.

$$CR_1 = (W_3/W_4)\times 100 \tag{D}$$

The encapsulation efficiency of the blowing agent in heat-expandable microspheres, Cel, of at least 90 wt % was evaluated as A, that ranging from 80 to less than 90 wt % was evaluated as B, and that being less than 80 wt % was evaluated as C.

Encapsulation Ratio, Encapsulation Efficiency, Retention Ratio and Maximum Encapsulation Ratio of Heat-Expandable Microspheres after Storage at High Temperature Dried heat-expandable microspheres were stored in an oven at 50° C. for 1 month. Then, the encapsulation ratio, encapsulation efficiency and retention ratio of the blowing agent were determined by the following methods. The maximum expansion ratio of the heat-expandable microspheres after storage at high temperature was determined by the method described above.

Determination of the Encapsulation Ratio of the Blowing Agent in the Heat-Expandable Microspheres after Storage at High Temperature The encapsulation ratio of the blowing agent in the heat-expandable microspheres after storage at high temperature was determined in the same manner as described above. The moisture content, $C_{w2}$(%), of the heat-expandable microspheres after storage at high temperature was determined with a Karl Fischer moisture meter (MKA-510N, manufactured by Kyoto Electronics Manufacturing Co., Ltd.). Then, 1.0 g of the heat-expandable microspheres was placed in a stainless-steel evaporation dish of 80 mm in diameter and 15 mm deep and weighed ($W_5$, g). To the sample, 30 ml of acetonitrile was added to uniformly disperse the microspheres, and the sample was kept still for 2 hours at room temperature. Then, the sample was dried at 110° C. for 2 hours and weighed ($W_6$, g). The encapsulation ratio of the blowing agent, $CR_3$ (wt %), was calculated by the following formula (E):

$$CR_3 = ((W_5 - W_6)/10)\times 100 - C_{w2} \tag{E}$$

Encapsulation Efficiency of Heat-Expandable Microspheres after Storage at High Temperature The encapsulation efficiency, $C_{e2}$(%), of the blowing agent in the heat-expandable microspheres after storage at high temperature was calculated by the following formula (F) from the theoretical encapsulation ratio of the blowing agent, $CR_1$ (wt %), and determined as described above. The encapsulation ratio of the blowing agent, $CR_3$ (wt %), was calculated by the above formula (E):

$$C_{e2}(\text{wt }\%) = (CR_3/CR_1)\times 100 \tag{F}$$

The encapsulation efficiency of the blowing agent in the heat-expandable microspheres after storage at high-temperature, $Ce_2$, of at least 90 wt % was evaluated as A, that ranging from 80 to less than 90 wt % was evaluated as B and that being less than 80 wt % was evaluated as C.

Retention Ratio of the Blowing Agent after Storage at High Temperature

The retention ratio of the blowing agent in the heat-expandable microspheres after storage at high temperature, $CR_x$ (wt %), was calculated by the following formula (G):

$$CR_X(\text{wt }\%) = (CR_3/CR_2)\times 100 \tag{G}$$

The retention ratio of the blowing agent in the heat-expandable microspheres after storage at high-temperature, $CR_x$ (wt %), of at least 95 wt % was evaluated as A, that ranging from 90 to less than 95 wt % was evaluated as B and that being less than 90 wt % was evaluated as C.

Stability of Production

An amount, $W_5$ (g), of an aqueous dispersion medium containing heat-expandable microspheres after polymerization step was filtered with a mesh screen (200-μm opening) manufactured by Kansai Wire Netting Co., Ltd. and the amount of the aqueous dispersion medium passing through the screen, $W_6$ (g), was measured. The ratio of the aqueous dispersion medium passing through the screen, Y (wt %), was calculated from $W_6$ (g) and $W_5$ (g) by the following formula:

$$Y(\text{wt }\%) = (W_6/W_5)\times 100$$

The ratio of the aqueous dispersion medium passing through the screen, Y (wt %), was evaluated by the following standard to represent the stability of the production of heat-expandable microspheres.

| | |
|---|---|
| $Y \geqq 90$ wt % | A |
| 50 wt % $\leqq Y < 90$ wt % | B |
| $Y < 50$ wt % | C |

Example 1

An aqueous dispersion medium having a pH within the range from 9.0 to 10.5 was prepared by adding 1 part by weight of HITENOL® BC-1025 (25-% aqueous solution of polyoxyethylene nonyl-propenyl phenylether sulfate salt) and 30 parts by weight of fine particles of magnesium hydroxide to 790 parts by weight of deionized water.

An oily mixture was prepared by mixing and dissolving 105 parts by weight of acrylonitrile, 105 parts by weight of methyl acrylate, 25 parts by weight of methyl methacrylate, 1.5 parts by weight of trimethylolpropane triacrylate, 2 parts by weight of dilauryl peroxide and 100 parts by weight of isobutane.

The above aqueous dispersion medium and oily mixture were agitated (at 10,000 rpm for 2 min) with a TK Homomixer Type 2.5 (manufactured by Primix Corporation) to prepare an aqueous suspension in which the oil droplets of the oily mixture were dispersed. The aqueous suspension was transferred to a compressive reactor of 1.5-liter capacity and purged with nitrogen. Then, polymerization was carried out with the initial reaction pressure of 0.3 MPa and agitation at 200 rpm at 65° C. for 20 hours and an aqueous dispersion medium containing heat-expandable microspheres was obtained. The ratio of the aqueous dispersion medium passing through the screen was at least 90 wt % and stability of the test production was adequate.

The aqueous dispersion medium containing the resultant heat-expandable microspheres was filtered and the collected heat-expandable microspheres were dried. The properties of the dried heat-expandable microspheres are shown in Table 1.

Examples 2 to 20 and Comparative Examples 1 to 5

In Examples 2 to 20 and Comparative Examples 1 to 5, heat-expandable microspheres were produced in the same manner as Example 1, except that the components and production conditions were changed as shown in Tables 1 to 3. The stability of each production process and the properties of the resultant heat-expandable microspheres are shown in Tables 1 to 3.

The details of the ingredients used in Examples and Comparative Examples are shown in Table 4.

TABLE 1

| | | | | Examples | | | | | | | | | |
|---|---|---|---|---|---|---|---|---|---|---|---|---|---|
| | | | | 1 | 2 | 3 | 4 | 5 | 6 | 7 | 8 | 9 | 10 |
| Oily mixture | Polymerizable component | Monomer (A) | HITENOL ® AR-1025 | | | | | | | | | | |
| | | | Antox ® MS-60 | | | | | | | | | | |
| | | | HITENOL ® KH-1025 | | | | | | | | | | |
| | | Monomer (B) | PHOSMER ® PE | | | | | | | | | | |
| | | Monomers other than (A) and (B) | Acrylonitrile | 105 | 105 | 105 | 105 | 105 | 105 | 105 | 105 | 105 | 105 |
| | | | Methacrylonitrile | | | | | | | | | | |
| | | | Methyl methacrylate | 105 | 105 | 105 | 105 | 105 | 105 | 105 | 105 | 105 | 105 |
| | | | Methyl acrylate | 25 | 25 | 25 | 25 | 25 | 25 | 25 | 25 | 25 | 25 |
| | | | Isobornyl methacrylate | | | | | | | | | | |
| | | Cross-linking agent | Trimethylolpropane triacrylate | 15 | 1.5 | 1.5 | 1.5 | 15 | 1.5 | 1.5 | 1.5 | 1.5 | 1.5 |
| | Polymerization initiator | | Dilauryl peroxide | 2 | 2 | 2 | 2 | 2 | 2 | 2 | 2 | 2 | 2 |
| | Blowing agent | | Isobutane | 100 | 100 | 100 | 100 | 100 | 100 | 100 | 100 | 100 | 100 |
| | | | Isopentane | | | | | | | | | | |
| | | | Isooctane | | | | | | | | | | |
| Aqueous dispersion medium | Water | | | 790 | 790 | 790 | 790 | 790 | 790 | 790 | 790 | 790 | 790 |
| | Fine particles of inorganic compound | | Magnesium hydroxide | 30 | 30 | 30 | 30 | 30 | 30 | 30 | 30 | 30 | 30 |
| | Sodium chloride | | | | | | | | | | | | |
| | Monomer (A) | | HITENOL ® BC-1025 | 1 | | | | | | | 1.5 | 0.5 | 0.1 |
| | | | HITENOL ® AR-1025 | | 1 | | | | | | | | |
| | | | HITENOL ® AR-2020 | | | 1 | | | | | | | |
| | | | Antox ® MS-60 | | | | 1 | | | | | | |
| | | | HITENOL ® KH-1025 | | | | | 1 | | | | | |
| | | | ADEKA REASOAP ® SR-1025 | | | | | | 1 | | | | |
| | Monomer (B) | | PHOSMER ® PE | | | | | | | 1 | | | |
| | HITENOL ® AN-10 | | | | | | | | | | | | |
| Performance of heat-expandable microspheres | Mean particle size (μm) | | | 16 | 15 | 18 | 16 | 18 | 10 | 12 | 13 | 23 | 26 |
| | Expansion-starting temperature (Ts) | | | 78 | 77 | 79 | 84 | 86 | 75 | 80 | 80 | 82 | 84 |
| | Maximum expansion temperature ($T_{max}$) | | | 115 | 112 | 115 | 117 | 123 | 111 | 119 | 116 | 122 | 124 |
| | Maximum expansion ratio ($R_{max1}$) | | | 13.6 | 12.8 | 13.1 | 13.5 | 13.0 | 12.0 | 12.4 | 12.2 | 13.9 | 14.2 |
| | Theoretical encapsulation ratio, $CR_1$ (wt %) | | | 29.5 | 29.5 | 29.5 | 29.5 | 29.5 | 29.5 | 29.5 | 29.5 | 29.5 | 29.5 |
| | Encapsulation ratio $CR_2$ (wt %) | | | 28.6 | 28.9 | 28.6 | 28.9 | 27.2 | 27.5 | 27.3 | 28 | 28.4 | 28.8 |
| | Encapsulation efficiency $C_{e1}$ (wt %) | | | 96.8 | 97.8 | 96.8 | 97.8 | 92.1 | 93.1 | 92.4 | 94.8 | 96.1 | 97.5 |
| | Evaluation of encapsulation efficiency | | | A | A | A | A | A | A | A | A | A | A |
| | Encapsulation ratio $CR_3$ (wt %) after high temperature storage | | | 28.3 | 28.5 | 28.2 | 28.7 | 26.9 | 27.3 | 27.1 | 27.4 | 28.1 | 28.7 |
| | Encapsulation efficiency $C_{e2}$ (wt %) after high temperature storage | | | 95.8 | 96.5 | 95.5 | 97.1 | 91.1 | 92.4 | 91.7 | 192.7 | 95.1 | 97.1 |
| | Evaluation of encapsulation efficiency after high temperature storage | | | A | A | A | A | A | A | A | A | A | A |
| | Maximum expansion ratio $R_{max2}$ after high temperature storage | | | 13.5 | 12.8 | 13.1 | 13.3 | 13.0 | 12.0 | 12.4 | 12.2 | 13.7 | 14.1 |
| | Retention ratio $CR_x$ (wt %) after high temperature storage | | | 99.0 | 98.6 | 98.6 | 99.3 | 98.9 | 99.3 | 199.3 | 97.9 | 98.9 | 99.7 |
| | Evaluation of Retention ratio after high temperature storage | | | A | A | A | A | A | A | A | A | A | A |
| Production stability of heat-expandable microspheres | | | | A | A | A | A | A | A | A | A | A | A |

TABLE 2

| | | | | Examples | | | | | | | | | |
|---|---|---|---|---|---|---|---|---|---|---|---|---|---|
| | | | | 11 | 12 | 13 | 14 | 15 | 16 | 17 | 18 | 19 | 20 |
| Oily mixture | Polymerizable component | Monomer (A) | HITENOL ® AR-1025 | | | | | | | | | | 5 |
| | | | Antox ® MS-60 | | 0.3 | | | | | | | | |
| | | | HITENOL ® KH-1025 | 0.7 | | | | | | | | | |
| | | Monomer (B) | PHOSMER ® PE | | | 0.5 | | | | | | | |
| | | Monomers other than (A) and (B) | Acrylonitrile | 118 | 118 | 118 | 118 | 105 | 105 | 105 | 105 | 105 | 105 |
| | | | Methacrylonitrile | | | | | 105 | 105 | 105 | 105 | 105 | 105 |
| | | | Methyl methacrylate | 117 | 117 | 117 | 117 | | | | | | |
| | | | Methyl acrylate | | | | | | | | | | |
| | | | Isobornyl methacrylate | | | | | 25 | 25 | 25 | 25 | 25 | 25 |
| | | Cross-linking agent | Trimethylolpropane triacrylate | 15 | 1.5 | 1.5 | 1.5 | 15 | 1.5 | 1.5 | 1.5 | 1.5 | 1.5 |
| | Polymerization initiator | | Dilauryl peroxide | 2 | 2 | 2 | 2 | 2 | 2 | 2 | 2 | 2 | 2 |
| | Blowing agent | | Isobutane | 100 | 50 | | 80 | 50 | 10 | | 50 | | |
| | | | Isopentane | | 50 | 100 | 20 | 50 | 90 | 50 | 50 | 50 | 50 |
| | | | Isooctane | | | | | | | 50 | | 50 | 50 |
| Aqueous dispersion medium | Water | | | 790 | 790 | 790 | 740 | 720 | 790 | 790 | 640 | 785 | 785 |
| | Fine particles of inorganic compound | | Magnesium hydroxide | 30 | 30 | 30 | 30 | 30 | 30 | 30 | 30 | 30 | 30 |
| | Sodium chloride | | | | | | 50 | 70 | | | 150 | | |
| | Monomer (A) | | HITENOL ® BC-1025 | | | | | | | | 1 | | |
| | | | HITENOL ® AR-1025 | | | 0.5 | | | | | | 5 | |
| | | | HITENOL ® AR-2020 | | | | 0.5 | | | | | | |
| | | | Antox ® MS-60 | 0.7 | | | | 1 | 0.5 | 8 | 0.5 | | |
| | | | HITENOL ® KH-1025 | | | | | | | | | | 0.5 |
| | | | ADEKA REASOAP ® SR-1025 | | 0.3 | | | | | | | | |
| | Monomer (B) | | PHOSMER ® PE | | | | 0.5 | | 0.5 | | | | |
| | HITENOL ® AN-10 | | | | 0.5 | | | | | | | | |
| Performance of heat-expandable microspheres | Mean particle size (μm) | | | 18 | 20 | 21 | 25 | 27 | 16 | 9 | 51 | 19 | 20 |
| | Expansion-starting temperature (Ts) | | | 84 | 92 | 104 | 93 | 103 | 121 | 131 | 125 | 130 | 133 |
| | Maximum expansion temperature ($T_{max}$) | | | 119 | 128 | 137 | 127 | 132 | 175 | 177 | 169 | 168 | 172 |
| | Maximum expansion ratio ($R_{max1}$) | | | 13.6 | 14.0 | 14.5 | 14.8 | 14.9 | 15.5 | 12.2 | 17.8 | 15.6 | 15.4 |
| | Theoretical encapsulation ratio, $CR_1$ (wt %) | | | 29.5 | 29.5 | 29.5 | 29.5 | 29.5 | 29.5 | 29.5 | 29.5 | 29.5 | 29.1 |
| | Encapsulation ratio $CR_2$ (wt %) | | | 28.6 | 28.4 | 28.5 | 28.2 | 28.6 | 28.6 | 27.4 | 28.9 | 28.4 | 28 |
| | Encapsulation efficiency $C_{e1}$ (wt %) | | | 97.0 | 96.2 | 96.6 | 95.5 | 96.8 | 96.8 | 92.7 | 97.8 | 96.1 | 96.2 |
| | Evaluation of encapsulation efficiency | | | A | A | A | A | A | A | A | A | A | A |
| | Encapsulation ratio $CR_3$ (wt %) after high temperature storage | | | 28.1 | 28.3 | 28.3 | 28.1 | 28.2 | 28.4 | 27.2 | 28.8 | 28.2 | 27.9 |
| | Encapsulation efficiency $C_{e2}$ (wt %) after high temperature storage | | | 95.3 | 95.9 | 95.9 | 95.1 | 95.5 | 96.1 | 92.1 | 97.5 | 95.5 | 95.8 |
| | Evaluation of encapsulation efficiency after high temperature storage | | | A | A | A | A | A | A | A | A | A | A |
| | Maximum expansion ratio $R_{max2}$ after high temperature storage | | | 13.6 | 14.0 | 14.2 | 14.6 | 14.8 | 15.5 | 12 | 17.5 | 15.4 | 15.3 |
| | Retention ratio $CR_x$ (wt %) after high temperature storage | | | 98.3 | 99.6 | 99.3 | 99.6 | 98.6 | 99.3 | 99.3 | 99.7 | 99.3 | 99.6 |
| | Evaluation of Retention ratio after high temperature storage | | | A | A | A | A | A | A | A | A | A | A |
| Production stability of heat-expandable microspheres | | | | A | A | A | A | A | A | A | A | A | A |

TABLE 3

| | | | | Comparative Examples | | | | |
|---|---|---|---|---|---|---|---|---|
| | | | | 1 | 2 | 3 | 4 | 5 |
| Oily mixture | Polymerizable component | Monomers other than (A) and (B) | Acrylonitrile | 105 | 105 | 118 | 105 | 105 |
| | | | Methacrylonitrile | | | | 105 | 105 |
| | | | Methyl methacrylate | 105 | 105 | 117 | | |
| | | | Methyl acrylate | 25 | 25 | | | |
| | | | Isobornyl methacrylate | | | | 25 | 25 |
| | | Cross-linking agent | Trimethylolpropane triacrylate | 1.5 | 1.5 | 1.5 | 1.5 | 1.5 |
| | Polymerization initiator | | Dilauryl peroxide | 2 | 2 | 2 | 2 | 2 |
| | Blowing agent | | Isobutane | 100 | 100 | 100 | 50 | 10 |
| | | | Isopentane | | | | 50 | 90 |
| | | | Isooctane | | | | | |
| Aqueous dispersion medium | Water | | | 790 | 790 | 790 | 790 | 790 |
| | Fine particles of inorganic compound | | Magnesium hydroxide | 30 | 30 | 30 | 30 | 30 |
| | Sodium chloride | | | | | | | |
| | Sodium alkyl sulfate | | | 1 | | | | |
| | Polyoxyethylene potassium alkyl phosphate | | | | 1 | | | |
| | HITENOL ® AN-10 | | | | | 1 | | |

TABLE 3-continued

| | | Comparative Examples | | | | |
|---|---|---|---|---|---|---|
| | | 1 | 2 | 3 | 4 | 5 |
| | Sodium p-styrene sulfonate | | | | 1 | |
| | Vinyl phosphonic acid | | | | | 1 |
| Performance of heat-expandable microspheres | Mean particle size (μm) | 10 | 13 | 16 | 25 | 18 |
| | Expansion-starting temperature. (Ts) | 75 | 77 | 83 | 105 | 119 |
| | Maximum expansion temperature. ($T_{max}$) | 104 | 107 | 118 | 134 | 171 |
| | Maximum expansion ratio ($R_{max1}$) | 9.8 | 10.1 | 11.6 | 11.8 | 12.2 |
| | Theoretical encapsulation ratio, $CR_1$ (wt %) | 29.5 | 29.5 | 29.5 | 29.5 | 29.5 |
| | Encapsulation ratio $CR_2$ (wt %) | 23.2 | 22.2 | 26.5 | 25.6 | 24.4 |
| | Encapsulation efficiency $C_{e1}$ (wt %) | 78.5 | 75.1 | 89.7 | 86.7 | 82.6 |
| | Evaluation of encapsulation efficiency | C | C | B | B | B |
| | Encapsulation ratio $CR_3$ (wt %) after high temperature storage | 20.8 | 19.8 | 24 | 22.5 | 21.8 |
| | Encapsulation efficiency $C_{e2}$ (wt %) after high temperature storage | 70.4 | 67.0 | 81.2 | 76.2 | 73.8 |
| | Evaluation of encapsulation efficiency after high temperature storage | C | C | B | C | C |
| | Maximum expansion ratio $R_{max2}$ after high temperature storage | 8.6 | 8.2 | 10.5 | 9.7 | 9.3 |
| | Retention ratio $CR_x$ (wt %) after high temperature storage | 89.7 | 89.2 | 90.8 | 87.9 | 89.3 |
| | Evaluation of Retention ratio after high temperature storage | C | C | B | C | C |
| Production stability of heat-expandable microspheres | | A | A | C | C | C |

TABLE 4

| Ingredients | Chemical name and concentration | Total sulfuric acid | Total phosphoric acid |
|---|---|---|---|
| HITENOL ® BC-1025 | Polyoxyethylene nonyl-propenyl phenylether ammonium sulfate salt (25%) | 9.2% | |
| HITENOL ® AR-1025 | Polyoxyethylene styrenated propenyl phenyl ether ammonium sulfate salt (25%) | 10.8% | |
| HITENOL ® AR-2020 | Polyoxyethylene styrenated propenyl phenyl ether ammonium sulfate salt (20%) | 6.5% | |
| HITENOL ® KH-1025 | Polyoxyethylene-1-(allyloxy-methyl) alkyl ether ammonium sulfate salt (25%) | 10.4% | |
| ADEKA REASOAP ® SR-1025 | Polyoxyalkylene alkenyl ether ammonium sulfate salt (25%) | 10.4% | |
| Antox ® MS-60 | Bis-(polyoxyethylene polycyclic phenyl ether) methacrylate sulfate salt (90%) | 3.3% | |
| PHOSMER ® PE | Polyethylene glycol (2-methacryloyloxyethyl) phosphate (100%) | | 20% |
| Sodium p-styrene sulfonate | Sodium p-styrene sulfonate (95%) | 38.8% | |
| Vinyl phosphonic acid | Vinyl phosphonic acid | | 66% |
| HITENOL ® AN-10 | Polyoxyalkylene alkenyl ether (100%) | | |
| Isobutane | 2-methyl propane | | |
| Isopentane | 2-methyl butane | | |
| Isooctane | 2,2,4-trimethyl pentane | | |

The heat-expandable microspheres in Examples 1 to 20 were produced by preparing an aqueous suspension in which oil droplets of an oily mixture containing a polymerizable component and blowing agent are dispersed in an aqueous dispersion medium containing the monomer (A) and/or the monomer (B); and by polymerizing the polymerizable component. The resultant heat-expandable microspheres had a thermoplastic resin shell containing polymerizable unsaturated monomer units, and the polymerizable unsaturated monomer units contained the polymerizable unsaturated monomer unit (a) and/or the polymerizable unsaturated monomer unit (b). Thus, the blowing agent was efficiently encapsulated in the shell, and such configuration prevented the escape of the blowing agent from the heat-expandable microspheres during storage at high temperature.

On the other hand, the heat-expandable microspheres in Comparative Examples 1 to 5 were produced with an aqueous dispersion medium which did not contain the monomer (A) and the monomer (B), and the thermoplastic resin constituting the shell of the heat-expandable microspheres contained the polymerizable unsaturated monomer units which did not contain the polymerizable unsaturated monomer unit (a) and the polymerizable unsaturated monomer unit (b). Thus, the blowing agent was not efficiently encapsulated in such heat-expandable microspheres, and such configuration did not prevent the escape of the blowing agent from the heat-expandable microspheres during storage at high temperature.

INDUSTRIAL APPLICABILITY

The heat-expandable microspheres produced in the process of the present invention are usable as a lightweight filler for putties, paints, inks, sealants, mortar, paper clays and porcelains and can be blended with a matrix resin to be processed by injection molding, extrusion molding or press molding and manufactured into foamed products having good properties of sound insulation, thermal insulation, heat shielding and sound absorbency.

The invention has been described in detail with reference to the above embodiments. However, the invention should not be construed as being limited thereto. It should further be apparent to those skilled in the art that various changes in form and detail of the invention as shown and described above may be made. It is intended that such changes be included within the spirit and scope of the claims appended hereto.

The invention claimed is:

1. A process for producing heat-expandable microspheres comprising a thermoplastic resin shell and a thermally vaporizable blowing agent encapsulated therein;

wherein the process includes preparing an aqueous suspension in which oil droplets of an oily mixture containing the blowing agent and a polymerizable component are dispersed in an aqueous dispersion medium, and in which fine particles of an inorganic compound and a monomer (A), or a monomer (A) and a monomer (B) described below are contained in the aqueous dispersion medium; and polymerizing the polymerizable component:

Monomer (A): Polymerizable unsaturated monomer having a total sulfuric acid value ranging from 3.3% to 15%, wherein the monomer (A) is bis-(polyoxyethylene polycyclic phenyl ether) methacrylate sulfate salt, wherein the total sulfuric acid value is a value obtained by measuring the concentration of sulfur atoms in the monomer (A) in an analysis with inductively coupled plasma (ICP) and converting the obtained concentration of total sulfur atoms into the amount of sulfuric acid ($SO_3$) based on the atomic weight of sulfur and the molecular weight of sulfuric acid, Monomer (B): Polymerizable unsaturated monomer having a total phosphoric acid value ranging from 20% to 30%, wherein the total phosphoric acid value is a value obtained by measuring the concentration of phosphorus atoms in the monomer (B) in an analysis with inductively coupled plasma (ICP), and converting the amount of phosphorus atoms into the obtained concentration of total phosphoric acid ($P_2O_5$) based on the atomic weight of phosphorus and the molecular weight of phosphoric acid, wherein the monomers (A) and (B) are different from the polymerizable component, the blowing agent comprises a hydrocarbon having a carbon number ranging from 3 to 13, the polymerizable component comprises a nitrile monomer, and an amount of the nitrile monomer ranges from 40 to 100 wt % of a monomer component in the polymerizable component, an encapsulation ratio of the blowing agent in the heat-expandable microspheres ranges from 10 to 35 wt %, and a total amount of the monomer (A) and the monomer (B) contained in the aqueous dispersion medium ranges from 0.0001 to 0.1 parts, excluding 0.1 parts, by weight to 100 parts by weight of the oily mixture.

2. The process for producing heat-expandable microspheres as claimed in claim 1, wherein the inorganic compound exists in the aqueous dispersion medium in a colloidal state.

3. The process for producing heat-expandable microspheres as claimed in claim 1, wherein the inorganic compound is a metal compound, and the metal in the compound is an alkali earth metal.

4. The process for producing heat-expandable microspheres as claimed in claim 1, wherein the polymerizable component further comprises a cross-linking agent in an amount ranging from 0.01 to 8 parts by weight to 100 parts by weight of the polymerizable component.

5. The process for producing heat-expandable microspheres as claimed in claim 1, wherein the nitrile monomer comprises acrylonitrile.

6. The process for producing heat-expandable microspheres as claimed in claim 1, wherein the pH of the aqueous dispersion medium ranges from 9 to 12.

7. The process for producing heat-expandable microspheres as claimed in claim 1, wherein a coefficient of variation (CV) of a particle size distribution of the heat-expandable microspheres is not greater than 30%.

8. The process for producing heat-expandable microspheres as claimed in claim 4, wherein the nitrile monomer comprises acrylonitrile.

9. The process for producing heat-expandable microspheres as claimed in claim 2, wherein the inorganic compound is a metal compound, and the metal in the compound is an alkali earth metal.

10. The process for producing heat-expandable microspheres as claimed in claim 8, wherein the pH of the aqueous dispersion medium ranges from 9 to 12.

* * * * *